(12) United States Patent
Nakagata et al.

(10) Patent No.: US 8,515,062 B2
(45) Date of Patent: Aug. 20, 2013

(54) IMAGE ENCRYPTION/DECRYPTION APPARATUS, METHOD AND PROGRAM

(75) Inventors: Shohei Nakagata, Kawasaki (JP); Kensuke Kuraki, Kawasaki (JP); Taizo Anan, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1182 days.

(21) Appl. No.: 12/129,266

(22) Filed: May 29, 2008

(65) Prior Publication Data
US 2009/0323950 A1 Dec. 31, 2009

(30) Foreign Application Priority Data
May 30, 2007 (JP) ................................ 2007-143301

(51) Int. Cl.
*G06F 21/00* (2006.01)
(52) U.S. Cl.
USPC .............. 380/54; 380/259; 726/26; 382/232; 382/237

(58) Field of Classification Search
USPC ................... 380/54; 382/237, 173–199, 232; 713/176
See application file for complete search history.

(56) References Cited

U.S. PATENT DOCUMENTS

| 5,491,563 | A | * | 2/1996 | Pomerantz | 358/405 |
| 5,726,435 | A | | 3/1998 | Hara et al. | |
| 5,898,779 | A | * | 4/1999 | Squilla et al. | 713/176 |
| 6,839,844 | B1 | * | 1/2005 | Okano | 713/176 |
| 6,954,532 | B1 | * | 10/2005 | Handley et al. | 380/54 |
| 7,970,139 | B2 | * | 6/2011 | Hayashi | 380/243 |
| 2004/0218822 | A1 | * | 11/2004 | Takahashi | 382/237 |

FOREIGN PATENT DOCUMENTS

| JP | 08-179689 | | 7/1996 |
| JP | 2938338 | | 6/1999 |
| JP | 2000232586 A | * | 8/2000 |

\* cited by examiner

*Primary Examiner* — Kambiz Zand
*Assistant Examiner* — Imhotep Durham
(74) *Attorney, Agent, or Firm* — Staas & Halsey LLP

(57) ABSTRACT

An image encryption apparatus encrypts a digital image by specifying a partial region from the digital image, converting the selected partial region into a processing image based on an encryption key, and specifying a position of the partial region by regularly converting a pixel value of the processing image.

23 Claims, 33 Drawing Sheets

FIG. 7

| (A) | |
|---|---|
| ENCRYPTION KEY | |
| 1234 (NUMERIC VALVE) | → |
| 2006 (NUMERIC VALVE) | → |
| ango (CHARCTER STRING) | → |
| code (CHARCTER STRING) | → |

| (B) |
|---|
| BINARY EXPRESSION |
| 10011010010 |
| 11111010110 |
| 01100001011011100110011101101111 |
| 01100011011011110110010001100101 |

INPUT IMAGE → CONVERSION OF MICRO REGIONS → SCRAMBLE IMAGE

ENCRYPTION KEY

*FIG. 10*
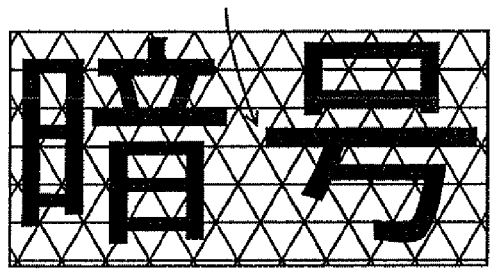
MICRO REGION OF A TRIANGLE
(A)
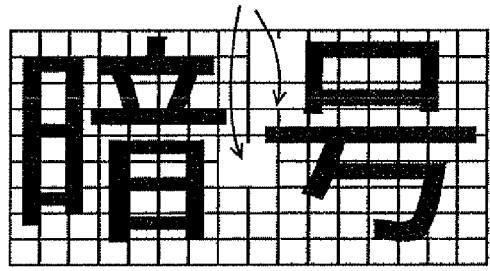
MICRO REGIONS OF VARIOUS SIZES AND SHAPES
(B)

FIG. 15
(A) 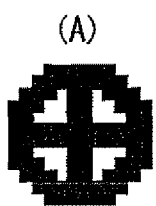  (B)   (C) 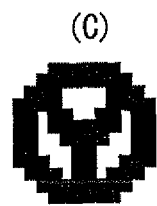  (D) 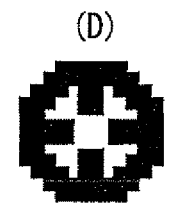

US 8,515,062 B2

IMAGE ENCRYPTION/DECRYPTION APPARATUS, METHOD AND PROGRAM

CROSS-REFERENCE TO RELATED APPLICATIONS

This application is related to and claims priority to Japanese patent application no. 2007-143301 filed on May 30, 2007 in the Japan Patent Office, and incorporated by reference herein.

BACKGROUND

1. Field

The present invention relates to an image encryption and decryption technique for preventing information leakage to a third party by visually encrypting a portion of image such as an important part or the like for a digital image and an image printed on printed matter.

2. Description of the Related Art

Aimed the progress of the information age, leakage of secret information has become a serious problem and hence the development of techniques to prevent information leakage is needed. For digital data, for example, techniques have been developed for encrypting data so that the content will not be visible if information is taken by a third party; some of these techniques are already utilized as useful unit for preventing information leakage.

Meanwhile, techniques for preventing the leakage of information from preprinted matter printed on paper and such have not been sufficiently developed, nor is there an example of a commercial product. Half of all information leakage is said to be related to printed matter, and therefore the development of a technique to prevent information leakage, as was done for digital data, is urgently required.

Examples in which countermeasures to information leakage from printed matter are required include bills issued at the time merchandise is purchased, credit card account statements, patient cards at hospitals, school report cards, and lists of names. The present invention is applicable to be used as a technique for preventing information leakage by encrypting an important part of those printed matters.

As a known example of encryption of printed matter in the conventional technique, there is a Patent Document 1, for example. In the Patent Document 1, first, an entirety of the image is divided into a plurality of blocks, and images of the divided blocks are rearranged based on a parameter obtained by an input password (encryption key). Further, the image of the block specified by the parameter is encrypted by black-and-white inversion and mirror inversion. In order to decrypt the encryption image, a frame for positioning is added outside of the image and the password (encryption key) is inputted. Then an original image is decrypted by a reverse procedure to that of the encryption.

Furthermore, such as a Patent Document 2, there is another conventional technique for imaging binary data to be embedded in printed matter. The imaging by this conventional technique can be achieved by presenting the binary data in a black-and-white square of a specified size and arranging the binary data in a matrix form. Moreover, in order to indicate a position in which the encryption is performed at the time of decryption, the printed matter is added with a symbol for positioning in a specified position of the matrix. Based on this symbol for positioning, it is possible to decrypt information embedded by taking an image with a scanner, a camera or the like.

[Patent Document 1] Japanese Laid-Open Patent Publication No. 1996-179689.

[Patent Document 2] Japanese Patent No. 2938338.

However, the above described technique has the following problem to solve.

For example, in the technique such as the Patent Document 1, the encryption is applied only to the entirety of the image. The problem is that it is impossible to perform the encryption efficiently in a case when the region to be encrypted in the entirety of the image is very small.

Furthermore, in the technique such as the Patent Document 1, a frame for positioning outside of the encryption image needs to be added, which causes a problem that the image information which originally exists in the position where the frame is added is overwritten at the time of encryption.

Moreover, since the technique such as the Patent Document 1 does not consider distortion inside of the image, it is impossible to correctly detect blocks as the encrypted image becomes larger.

In the technique such as the Patent Document 2, the data containing little information such as text information can be embedded. However, this technique is not suitable for storing the data containing much information such as an image or audio information as well as having no difficulty if some decryption errors occur. Moreover, there was a problem that the data had to be a certain size and a square shape, and thus this technique was not applicable to an application which hides part of a character.

Based on an assumption that monochrome characters or diagrams are applied in the technique such as the Patent Document 2, there was a problem that this technique was not applicable to a color image such as a photo.

SUMMARY

According to one aspect of the embodiment, an image encryption apparatus that encrypts a digital image, the image encryption apparatus includes an encryption region specifying unit that specifies a partial region to be encrypted from the digital image, an image conversion unit that converts the partial region selected by the encryption region specifying unit into a processing image based on an encryption key, and a pixel value conversion unit that generates a conversion image by regularly converting a pixel value of the processing image converted by the image conversion unit in order to make a position of the partial region specifiable.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 7 is a diagram showing an example of inputting an encryption key;

FIG. 10 is a diagram showing a modified example of shape of a micro region in scramble processing;

FIG. 15 is a diagram showing an example of positioning marker used for the encryption processing;

DETAILED DESCRIPTION OF THE PREFERRED EMBODIMENTS

Figure 1:
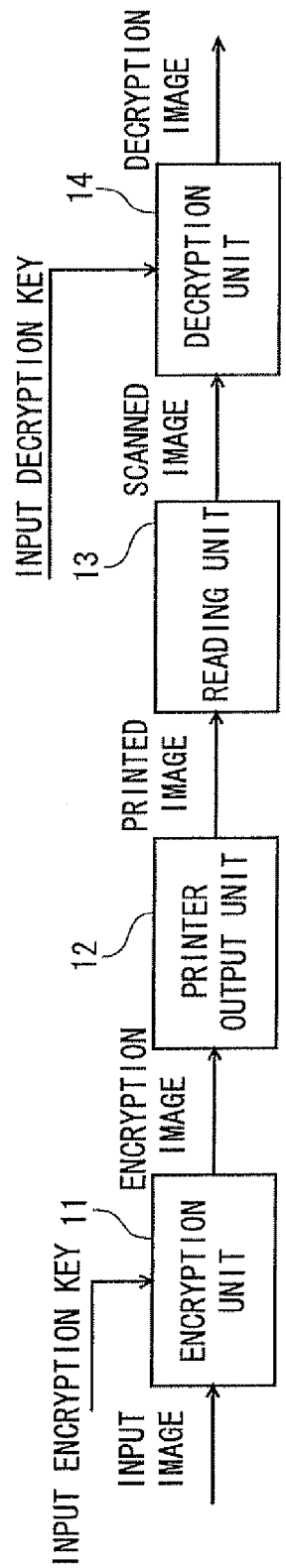
FIG. 1 is a diagram showing an (a first) overview of processing of an embodiment applying the present invention.

In the present invention, it is possible to encrypt part of an entirety of an image. In contrast to "a positioning frame" of a Patent Document 1, according to the embodiments of the invention a conversion image is generated by pixel value conversion processing of an input image, which reduces loss of information of the input image to a minimum. Moreover, the present invention is characterized in that a scramble block unit can be easily detected.

The present invention makes it possible to encrypt image data containing much information which can not be encrypted in a technique such as the above described Patent Document 2 so as not to be visually seen by a person.

The present invention uses the following three units in order to encrypt the part of input image and to make the encrypted region specifiable at the time of decryption.

A first unit is a unit which encrypts by regularly converting a pixel value of an encryption region and generating a specific pattern corresponding to pixel value conversion.

A second unit is a unit which adds a positioning marker for specifying an encryption position to at least two of the four corners of the encryption region.

A third unit is a unit which adds at least one check mark for verifying a validity of a decryption image into the encryption region before encryption processing.

In the present invention, it is possible to specify the encrypted region at the time of decryption even in the case when part of the input image is encrypted by using those three units. Thus, it is possible to restore an original image to be visible (readable or understandable) to a person.

That is, according to another aspect of the present invention, the present invention is characterized in that image encryption is performed in an image encryption apparatus encrypting a digital image into an encryption image, comprising specifying a partial region to be encrypted from the digital image, regularly converting the selected partial region into a processing image in order to make a position of the partial region specifiable. The encryption image then can be printed with a partial printed region corresponding to the partial image region of the digital image, and the partial printed region is not visible (not readable or understandable by a person).

Furthermore, as for conversion into a processing image, it is desirable that the partial region is divided into micro regions and rearranged based on the encryption key or the partial region is converted into compressed data by an arbitrary compression method and each bit of the converted compressed data is arranged as a white pixel or a black pixel of an arbitrary size.

As for conversion of the processing image into a conversion image, it is desirable that the conversion image generating generates nearly a stripe pattern by converting the pixel value at a certain terminal in a transverse direction of the processing image and converting the pixel value at the certain terminal in a longitudinal direction of the processing image.

In order to specify the position of the partial region, it is desirable to generate an encryption image by adding a specific marker to the generated conversion image.

Moreover, it is desirable that the marker is shaped like a circle or a polygon with a solid line and has a plurality of lines intersecting with a circumference of the circle or the polygon inside whereof or that a foreground of the marker is generated by the pixel value conversion.

According to another aspect of the present invention, the present invention is characterized in that image decryption is performed in an image decryption apparatus decrypting the encryption image into the digital image, comprising detecting the specific marker added to encryption image in order to specify the encrypted partial image region, detecting the encrypted partial image region based on the detected marker, detecting the decryption position in which the pixel value is regularly converted in the detected encrypted partial image region, and decrypting the encrypted partial image region into the digital image based on the detected encryption position and a decryption key.

Furthermore, according to another aspect of the present invention, the present invention is characterized in that the image decryption is performed in the image decryption apparatus decrypting the encryption image into the digital image, comprising detecting the encrypted encrypted partial image region, detecting the encryption position in which the pixel value is regularly converted in the detected encrypted partial image region, decrypting the encrypted partial image region into the digital image based on the detected encryption position and the decryption key, and detecting a specific check mark for verifying a validity of the decryption from the decrypted digital image.

Moreover, according to another aspect of the present invention, the present invention is characterized in that the image decryption is performed in the image decryption apparatus decrypting the encryption image into the digital image, comprising detecting the specific marker added to encryption image in order to specify the encrypted partial image region, detecting the encrypted partial image region based on the detected marker, detecting the decryption position in which the pixel value is regularly converted in the detected encrypted partial image region, decrypting the encrypted partial image region into the digital image based on the detected encryption position and a decryption key, and detecting the specific check mark for verifying a validity of the decryption from the decrypted digital image.

Embodiments applying the present invention will be described based on figures as follows.

First, an overview of encryption processing and decryption processing according to a first to third embodiments applying the present invention will be described by using FIG. 1 and FIG. 2.

FIG. 1 is a diagram showing (a first) an overview of processing of the embodiment applying the present invention.

In FIG. 1, an encryption unit 11 (referred to as encryption units 11A, 11B and 11C, respectively, according to each of the first to third embodiments) outputs the encryption image in which part of the digital image is encrypted based on the inputted digital image and the encryption key indicating the encryption method. In this case, the input image inputted in the encryption unit 11 may be in a format in which non-image data is converted into the digital image, such as a document format formed by a document editing device or a document editing application program, a PDF format, a HTML format or the like. The input image may also be the digital image in which a paper medium such as printed matter is digitally imaged by using a copier (including a multifunction printer), a scanner, a facsimile, a mobile phone, a digital camera or the like.

A printer output unit 12 prints the digital image which is encrypted by the encryption unit 11 on a printable physical medium such as paper. In this case, the printer output unit 12 is not limited to a printer printing the image data of a personal computer (PC) on paper, but includes an output apparatus such as a copier (including a multifunction printer) or a facsimile. By using a scanner, a camera, a copier (including a multifunction printer) or the like, a reading unit 13 reads a printed image outputted by the printer output unit 12.

Then a decryption unit 14 (referred to as decryption units 14A, 14B and 14C, respectively, according to each of the first to third embodiments) obtains the decryption image by the printed image output by the printer output unit 12, based upon reading the printed image by the reading unit 13 and the input decryption key. Only if the inputted decryption key is correct, the encryption image can be decrypted properly and thus the information hidden inside the encryption by the encryption unit 11 can be seen.

Furthermore, the decrypted image can be converted into the non-image data in a document format, a PDF format, a HTML format or the like, or can be outputted as a paper medium by a printer, a copier (including a multifunction printer), a facsimile or the like.

Figure 2:
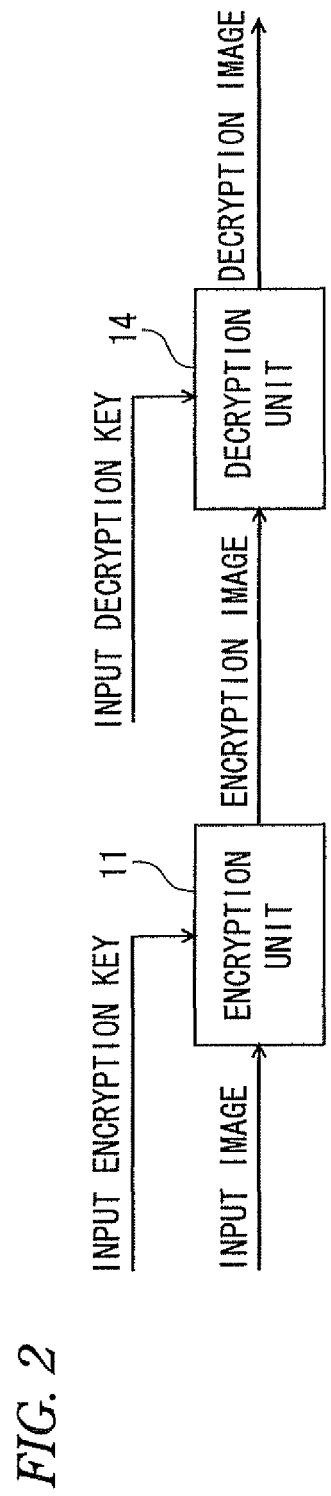
FIG. 2 is a diagram showing an (a second) overview of the processing of the embodiment applying the present invention.
Figure 3:
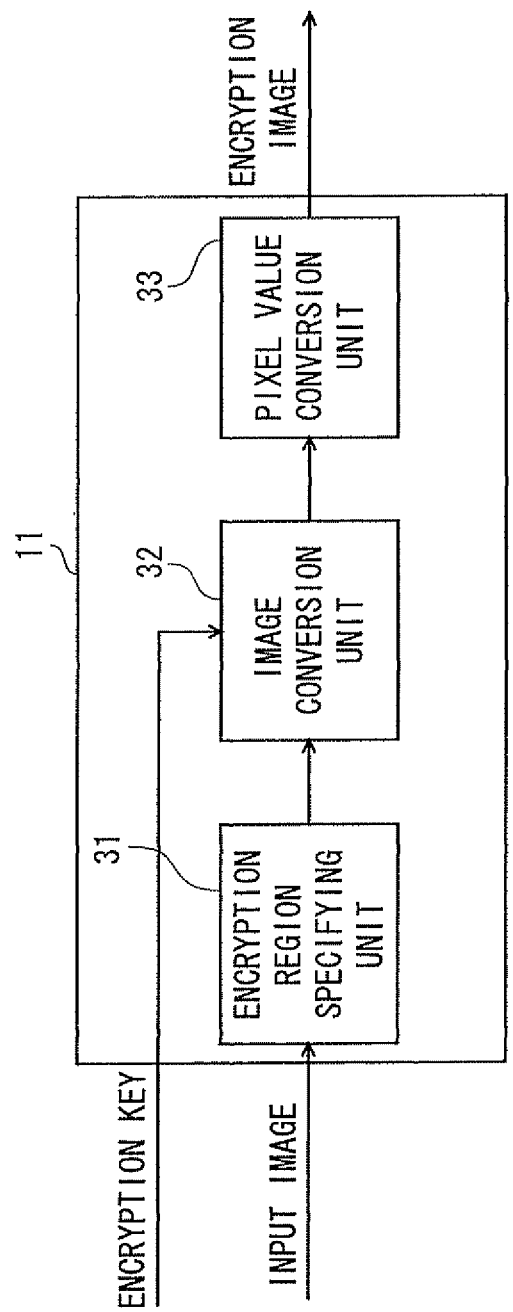
FIG. 3 is a diagram showing an overview of encryption processing of the present invention.

FIG. 2 is a diagram showing (a second) an overview of the processing according to the embodiment applying the present invention.

As shown in FIG. 2, the encryption method and the decryption method according to the first to third embodiments applying the present invention can input the digital image, which is encrypted by the encryption unit 11, as an electronic document image into the decryption unit 14 without a printer, scanner or the like to obtain the decryption image.

Figure 4:
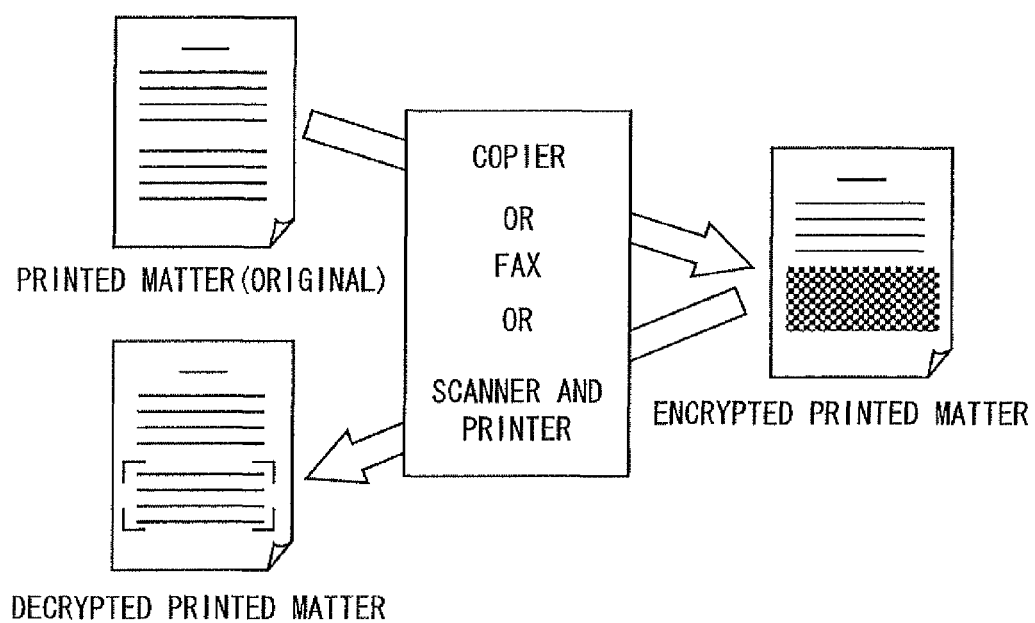
FIG. 4 is a diagram illustrating encryption and decryption of printed matter.

The above described encryption unit 11 and the decryption unit 14 can achieve functions thereof by using various apparatuses such as a PC, a copier (including a multifunction printer), a facsimile, a mobile phone, or a digital camera. For example, if a copier or a facsimile is provided with the encryption unit 11 and the decryption unit 14, it becomes possible to encrypt an original of the printed matter into the printed matter as shown in FIG. 4. Further, the decryption thereof becomes possible.

As described above, the digital image which is to be encrypted can be digitally imaged by reading the printed matter by an optical device such as a scanner, or can be the digital image data converted from the non-image data in such as document editing software, PDF, HTML, or XML. That is, the encryption apparatus of the present invention is applicable to various data by imaging the data which is to be encrypted. Further, the encryption image generated by encrypting the digital image can be a digital image, can be printed, and can be converted into another format.

Next, each of the first to third embodiments applying the present invention will be described, respectively.

First, description will be made of the first embodiment applying the present invention.

Figure 5:
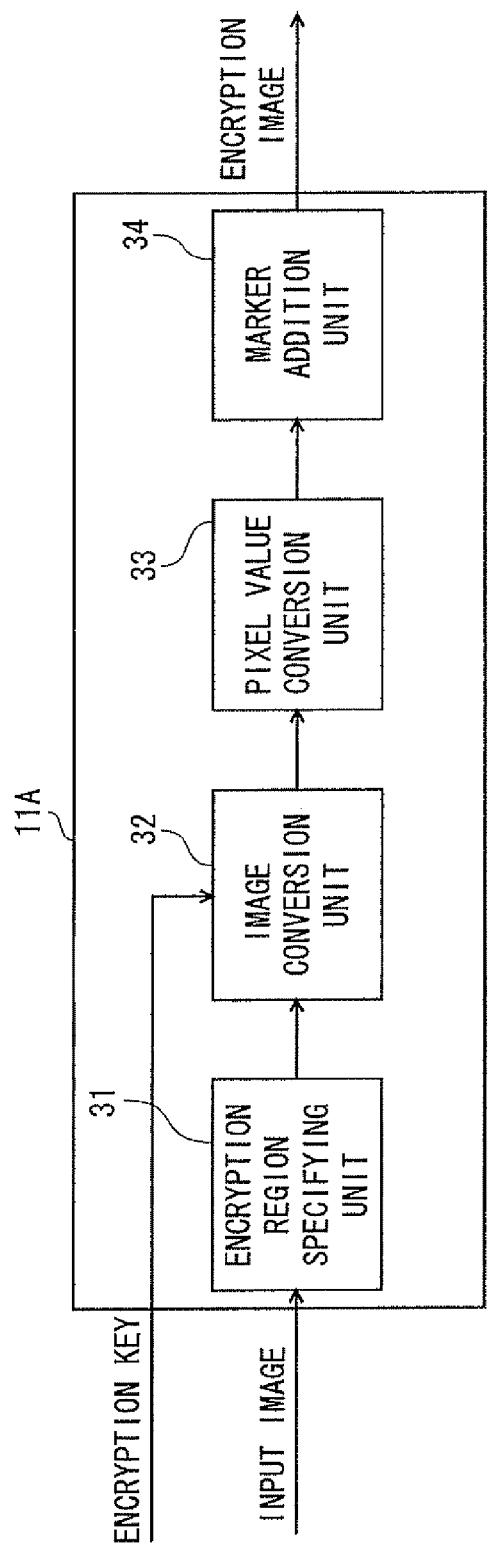
FIG. 5 is a diagram showing an overview of the encryption processing according to a first embodiment.

FIG. 5 shows a diagram showing an overview of the encryption processing according to the first embodiment.

In FIG. 5, the encryption unit 11A includes an encryption region specifying unit 31, an image conversion unit 32, a pixel value conversion unit 33, and a marker addition unit 34.

The encryption region specifying unit 31 selects a region to be encrypted from the input image including the region which is desired to be encrypted.

Figure 6:
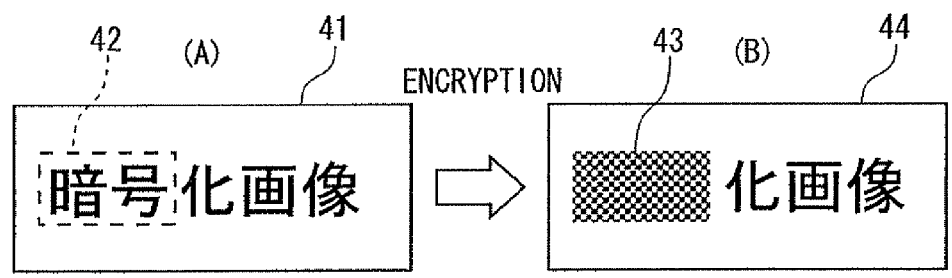
FIG. 6 is a diagram showing an example of selecting an encryption region.

FIG. 6 is a diagram showing an example of selecting the encryption region.

That is, as shown in FIG. 6(A), the encryption region specifying unit 31 selects a region 42 to be encrypted from the digital image (input image) 41 including the region which is desired to be encrypted. By the processing of the image conversion unit 32 and the pixel value conversion unit 33 which are to be described later, the region 42 is converted into a conversion image 43 as shown in FIG. 6(B), and the digital image 41 is converted into an encryption image 44 including the conversion image 43.

FIG. 5 will be described again.

If the region 42 to be encrypted is selected by the encryption region specifying unit 31, the region 42 to be encrypted and the encryption key are inputted in the image conversion unit 32 and the image of the region 42 to be encrypted is visually converted by a conversion method corresponding to the encryption key. A conversion parameter in this case is formed by binary data obtained by the inputted encryption key.

FIG. 7 is a diagram showing an example of inputting the encryption key.

The example shown in FIG. 7 is an example of the encryption key and the binary data generated by the encryption key. For example, a numeric value "1234" as the encryption key is inputted as the binary data "100011010010". A character string "ango" as the encryption key is inputted as the binary data "0110000101101110011001101101111".

As an image conversion method, the first embodiment shows two methods. One is a conversion method by performing the processing of dividing the image into micro regions and for rearranging the micro regions (referred to as scramble processing), and the other one is a conversion method by performing the processing of compressing the image, or any combinations thereof.

First, description will be made of the scramble processing.

The scramble processing divides the image of the selected region 42 into micro regions of a certain size, and rearranges the micro regions by the binary data obtained by the encryption key.

Figure 8:
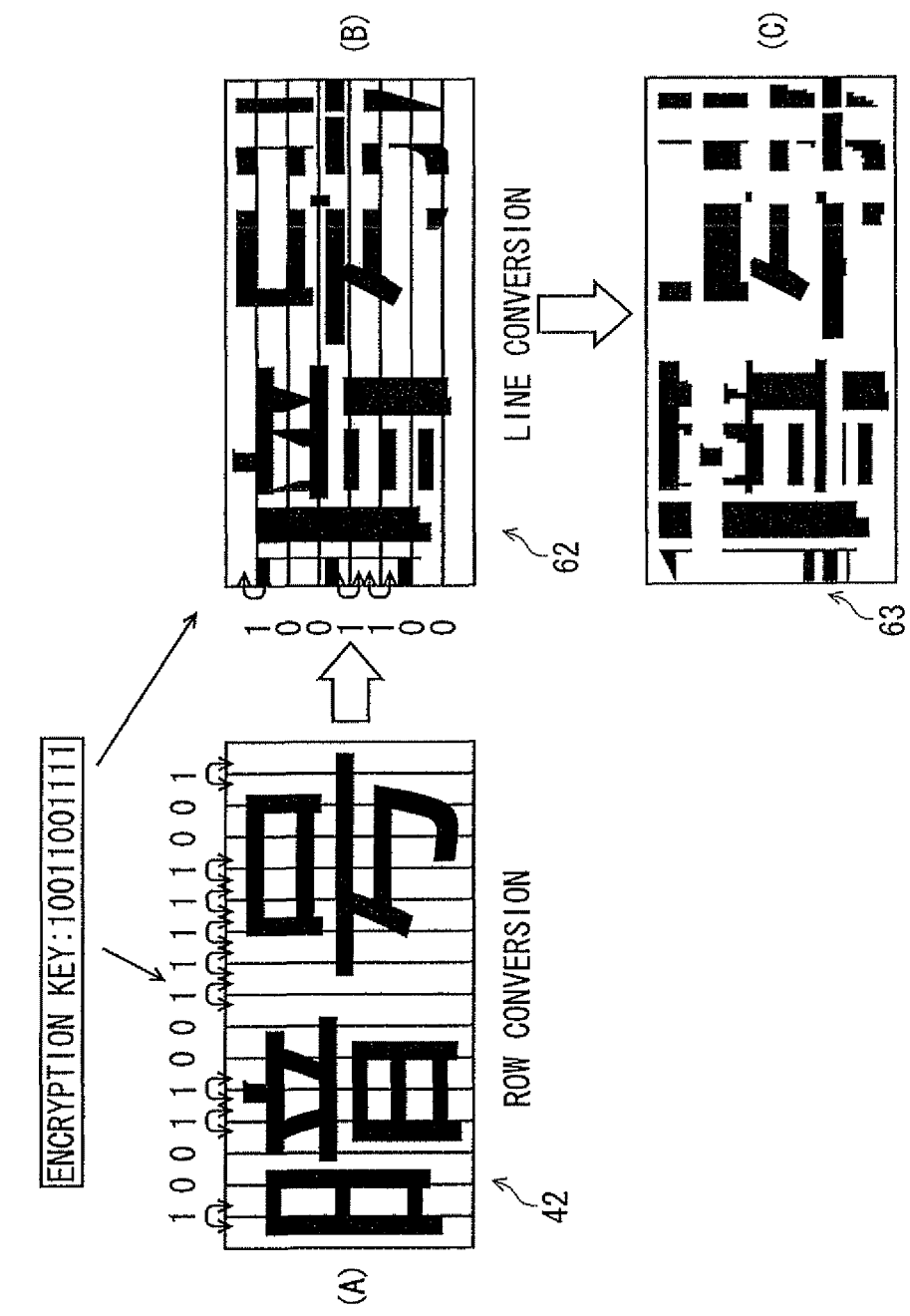
FIG. 8 is a diagram showing an example of scramble processing in an image conversion unit.

FIG. 8 is a diagram showing an example of the scramble processing in the image conversion unit.

As shown in FIG. 8(A), the region 42 selected by the encryption region specifying unit 31 is first divided in a longitudinal direction in order to correspond each bit of the binary string of an encryption key 61 to a boundary of the divided region 42 sequentially from the left. If the bit is "1", adjacent division strings are converted. If the bit is "0", the processing performing nothing is performed sequentially from the left side. If there is a shortage of bit number of the binary string corresponding to a number of division boundary, an identical binary string is repeated from the position of the shortage to perform conversion processing to the right edge of the region 42.

As shown in FIG. 8(B), an image region 62 which was given the above described conversion processing is divided in a transverse direction in order to correspond each bit of the binary string of the encryption key 61 to the boundary of the divided image region 62 sequentially from the top. The conversion processing is performed from the top by line in the same way as of the longitudinal division.

As shown in FIG. 8(C), as a result of the conversion processing performed on each of the divided image, a scramble image 63 which is a processing image generated by performing the scramble processing on the original region 42 can be obtained. An extension method of the example of the scramble processing can be performed more than two times both in a transverse direction and a longitudinal direction. Further, the size of the divided region can be changed at the time of a second or later conversion. Moreover, it is possible to use other binary string to convert the divided region in a transverse direction and a longitudinal direction. Such extension method is particularly useful as a method for preventing that an identical image is generated from a different encryption key when the size of the input image is small and the bit length of the encryption key is long.

Figure 9:
FIG. 9 is a diagram showing another example of the scramble processing in the image conversion unit.

FIG. 9 is a diagram showing another example of the scramble processing in the image conversion unit.

As another method of the scramble processing different from the scramble processing described by using FIG. 8, a method for converting a pixel value by micro region is possible as shown in FIG. 9. That is, the input image is divided into micro regions of a rectangular shape and the divided micro regions are converted each other. Due to this, the scramble increases more than the above described method for converting in a transverse direction and a longitudinal direction (row and line). This can improve the encryption strength.

FIG. 10 is a diagram showing a modified example of shape of the micro region of the scramble processing.

The shape of the micro region at the time of the scramble processing can be, for example, a triangular shape shown in FIG. 10(A) other than a quadrangular shape shown in FIG. 9. Moreover, as shown in FIG. 10(B), the micro regions of different shapes and sizes can exist together.

Next, description will be made of the conversion method by performing the compression processing on the image.

Figure 11:
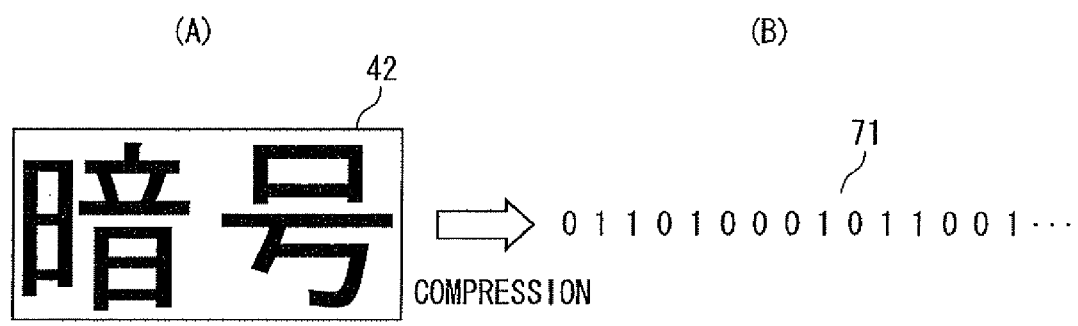
FIG. 11 is a diagram showing compression processing in the image conversion unit.

FIG. 11 is a diagram showing the compression processing in the image conversion unit.

If the input image 41 is a binary image, the region 42 selected by the encryption region specifying unit 31 is compressed as shown in FIG. 11(A) in order to generate a binary string 71 shown in FIG. 11(B). In this case, it is possible to apply all kinds of compression methods such as a Run Length compression used to transfer the binary image data by a facsimile device or a Joint Bi-level Image experts Group (JBIG) compression which is a standard compression method of binary image.

Figure 12:
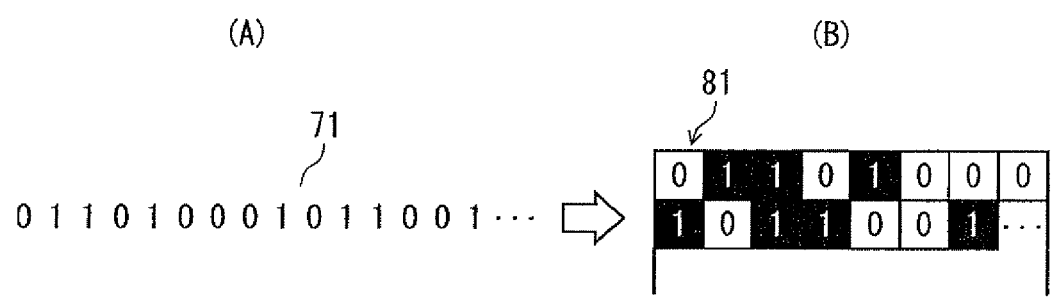
FIG. 12 is a diagram showing processing of imaging conversion data.

FIG. 12 is a diagram showing the processing of imaging the conversion data.

Following the compression of the region 42 shown in FIG. 11, each bit of the binary string 71 which is conversion compression data is extended to a rectangular shape of a specified size in order to generate a rectangular image (processing image) 81, and is arranged as the black-and-white rectangular image 81 in the region 42 of the image to be encrypted. As shown in FIG. 12(B), the image is white if the bit is "0", and the image is black if the bit is "1".

If the conversion compression data (the binary string 71) is arranged to fit in the image of the selected region 42, the size of the rectangular image 81 depends on a compressibility of the selected region 42. For example, the size of the rectangular image 81 is at most 2×2 pixel if the compressibility is ¼ or less, and the size of the rectangular image 81 is at most 4×4 pixel if the compressibility is ¹⁄₁₆ or less.

On the other hand, if the size of the rectangular image 81 is specified in advance and the compression data has to fit in the image of the selected region 42, it is necessary to achieve the compressibility which depends on the size of the rectangular image 81 in a first compression processing of image. For example, the compressibility has to be ¹⁄₁₆ or greater if the rectangular becomes a size of 4×4 pixel. In this case, a compression method for dropping information of the selected region 42 in advance or a method of lossy compression can be useful.

By the above described encryption processing by expanding the compression data to be compressed, it is possible to recognize expanded black-and-white blocks if the encryption image is read by, for example, a low resolution camera.

FIG. 5 will be described again.

In the pixel value conversion unit 33, a pixel of a scramble image 63 converted by the image conversion unit 32 is converted at a certain interval, and the conversion image 43 is formed in a nearly lattice-shaped stripe pattern.

Figure 13:
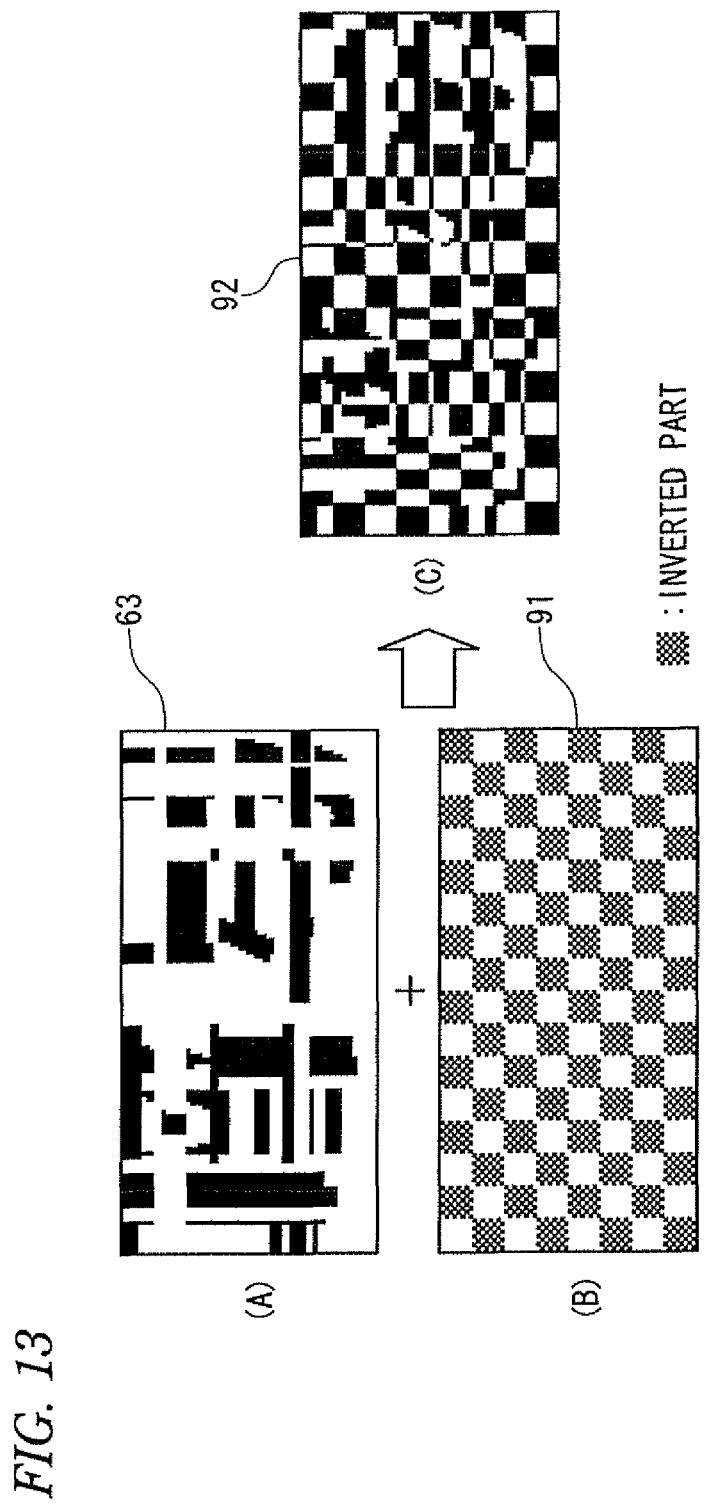
FIG. 13 is a diagram showing an (a first) example of pixel value conversion processing in a pixel value conversion unit.

FIG. 13 is a diagram showing an (a first) example of the pixel value conversion processing in the pixel value conversion unit 33.

In the pixel value conversion unit 33, the pixel of a scramble image 63 generated by performing the scramble processing on the region 42 in the image conversion unit 32 is converted at the certain interval and the encryption image 44 is formed in a nearly lattice-shaped stripe pattern as a whole.

For example, as shown in FIG. 13, a conversion image 92 in which the encryption image 44 formed in a nearly lattice-shaped stripe pattern as a whole can be obtained as shown in (C) can be obtained by performing conversion such a way that the scramble image 63 shown in FIG. 13(A) is given inversion processing in a colored part of a checkered pattern image 91 shown in (B). Thus, the generated stripe pattern is used to detect a detailed position in the encryption region when the encryption image 44 is decrypted.

Another conversion can be applied to a series of these processing. For example, the inversion processing of pixel value can be processing of adding a specified value.

Moreover, even though the checkered pattern image 91 shown in FIG. 13(B) has the same size as that of the scramble image 63 shown in (A), only central part of the scramble image 63 other than the circumference thereof can be given the inversion processing by using the size which is smaller than the scramble image 63.

Figure 14:
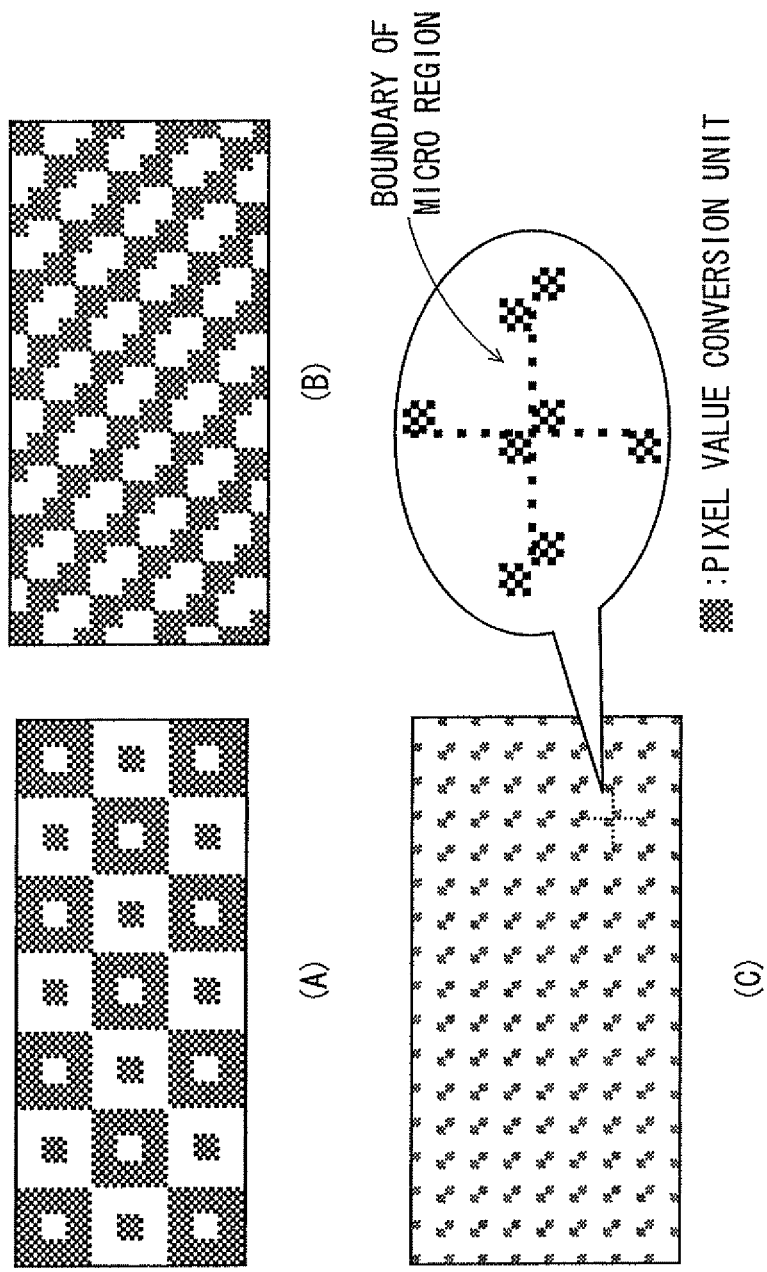
FIG. 14 is a diagram showing an (a second) example of the pixel value conversion processing in the pixel value conversion unit.

FIG. 14 is a diagram showing an (a second) example of the pixel value conversion processing in the pixel value conversion unit.

The region 42 in which the pixel value is converted can apply various pattern as shown in FIG. 14(A) to (C). The pixel value conversion is processing designed to detect a boundary position between the micro regions with high accuracy, so that the pixel value conversion may be performed only on boundary part shown in FIG. 14(A). Moreover, the pixel value conversion is performed on the micro region shown in FIG. 14(B) while shifting little by little, the boundary between conversion and non-conversion appears at a shorter interval, so that the position of the pixel of the encryption image 44 can be detected in more detail by decryption processing. As shown in FIG. 14(C), if the pixel value conversion is performed only on the part where the boundaries cross, it is possible to reduce deterioration of the image to the minimum at the time of decryption of the image printed on paper or the like read by a scanner, a camera or the like.

Furthermore, it is also possible to apply the pixel value conversion performed by unit of the division region which is different from the shape of the micro region (e.g., the pixel value conversion performed by unit of the divided region shaped like a triangle).

Moreover, if the shape of the micro region is not a uniformly-sized quadrangle, but is a triangle as shown in FIG. 10 (FIG. 10(A)), or various sizes and shapes exist together (FIG. 10(B)), the pixel value conversion can be performed according to the shape which is not limited to the above described conversion example (e.g., the pixel value conversion of a triangular shape can be performed on the micro region shaped like a triangle.). The pixel value conversion which is unrelated to the shape of the micro region can also be performed (e.g., the pixel value conversion of a quadrangular shape can be performed on the micro region shaped like a triangle.)

As described above, according to the present invention, a regular pattern indicating the encryption position is not generated by overwriting the input image as shown in the Patent Document 1, but is generated by converting the pixel value of the input image. Therefore, image information of the edge part of the encryption image is not erased because of the position detection like in the conventional technique. This makes it possible to perform the encryption in such a way that the original image information exists with the position detection information.

If the part constructing the pattern includes some kind of the image information, regularity thereof is destroyed in some degree. However, the encryption position can be detected by using a statistical characteristic of the entirety of the encryption image as described later in the processing of the decryption unit 14.

FIG. 5 will be described again.

In the marker addition unit 34, out of the four corners of the conversion image 92 which is given the conversion processing in the pixel value conversion unit 33, for example, positioning markers are added to three of the four corners except the right bottom corner in order to generate the encryption image 44.

The marker addition unit 34 arranges the positioning markers for specifying the position of the encrypted region 42, for example, to three of the four corners except the right bottom corner of the conversion image 92.

FIG. 15 is a diagram showing an example of the positioning marker used in the encryption processing.

The positioning marker used in the first embodiment has to be shaped like a cross in a circle as shown in FIG. 15(A). To put it plainly, the shape of the positioning marker can be constructed with a circle or a polygon in a solid line and a plurality of lines intersecting with a circumference of the circle or the polygon inside whereof. Such as the positioning marker shaped lines crossed in a rectangle as shown in FIG. 15(B), the positioning marker having three lines coming out radially from the center toward the circumference as shown in (C), or the positioning marker having a disconnection of the line as shown in (D) is given as an example.

As for color composition of the positioning marker, a background can simply be white and a foreground can simply be black. However, the color composition is not limited to this and is allowed to be changed according to color (pixel value) distribution of the conversion image 92. Moreover, it is possible to form the positioning marker by inverting the pixel value of the foreground and having the color of the background of the digital image 41 remained, not by specifying predetermined colors for the background and the foreground. This makes it possible to perform the encryption of the image while remaining the input information of the part of the positioning marker.

Figure 16:
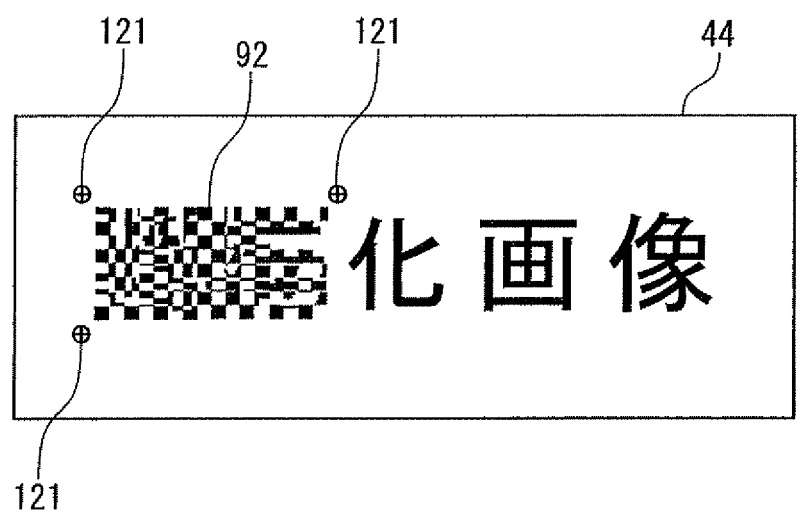
FIG. 16 is a diagram showing an example of an encryption image.

FIG. 16 is a diagram showing an example of the encryption image.

The encryption image 44 shown in FIG. 16 is generated in the end by the above described processing of the encryption unit 11A. The encryption image 44 includes a conversion image 92 and a positioning marker 121.

Furthermore, according to the encryption method of the first embodiment, if "rearranging processing (scramble processing) of the micro regions" is used in the image conversion unit 32, the encryption can be applied not only to a binary image but also to a gray scale image and a color image.

Figure 17:
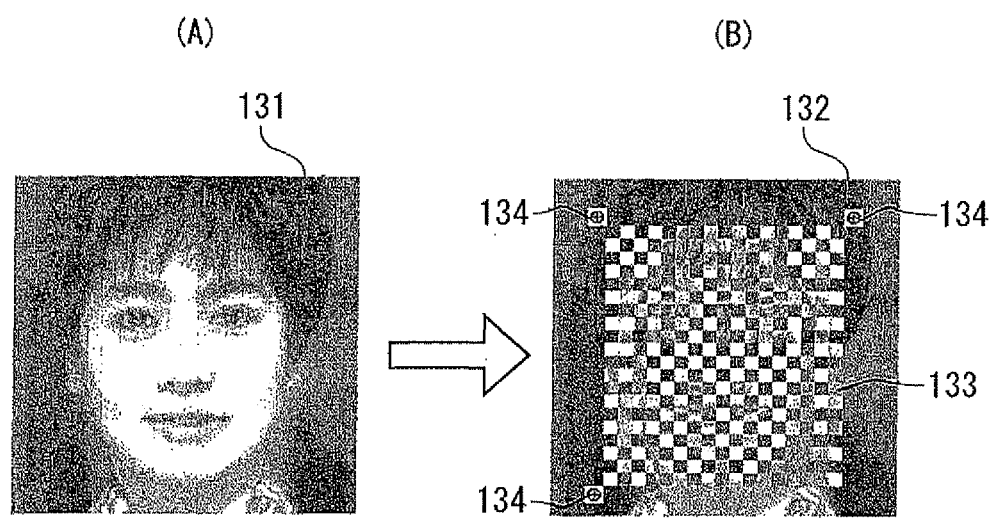
FIG. 17 is a diagram showing an example of encrypting a gray scale image.

FIG. 17 is an example of encrypting the gray scale image.

In FIG. 17, a gray scale image 131 shown in (A) is encrypted by the processing of the encryption unit 11A in order to generate an encryption image 132 including a conversion image 133 and a positioning marker 134 as shown in (B).

Next, the decryption unit 14A will be described.

Figure 18:
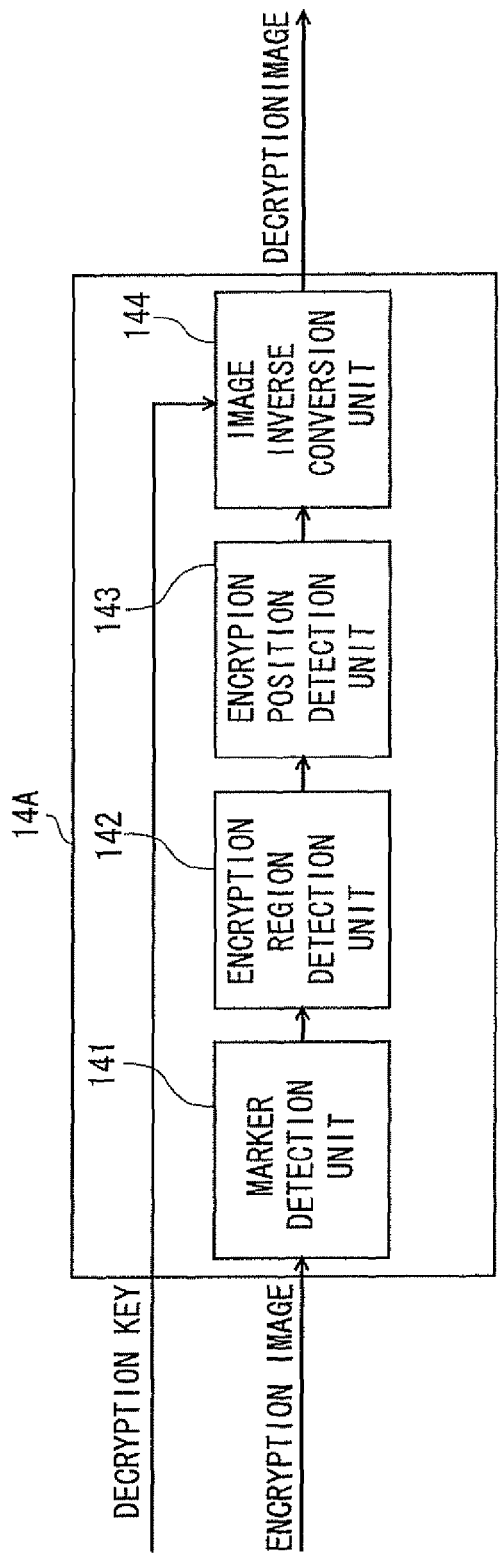
FIG. 18 is a diagram showing an overview of decryption processing according to the first embodiment.

FIG. 18 is a diagram showing an overview of the decryption processing according to the first embodiment.

In FIG. 18, the decryption unit 14A includes a marker detection unit 141, an encryption region detection unit 142, an encryption position detection unit 143, and an image inverse conversion unit 144.

By using a general image recognition technique, the marker detection unit 141 detects the position of the positioning marker added by the above described marker addition unit 34. For example, pattern matching and an analysis related to a connectivity of figures are applicable as a detection method.

Based on a positional relationship of the three positioning markers detected by the marker detection unit 141, the encryption region detection unit 142 detects the region of the image which is encrypted.

Figure 19:
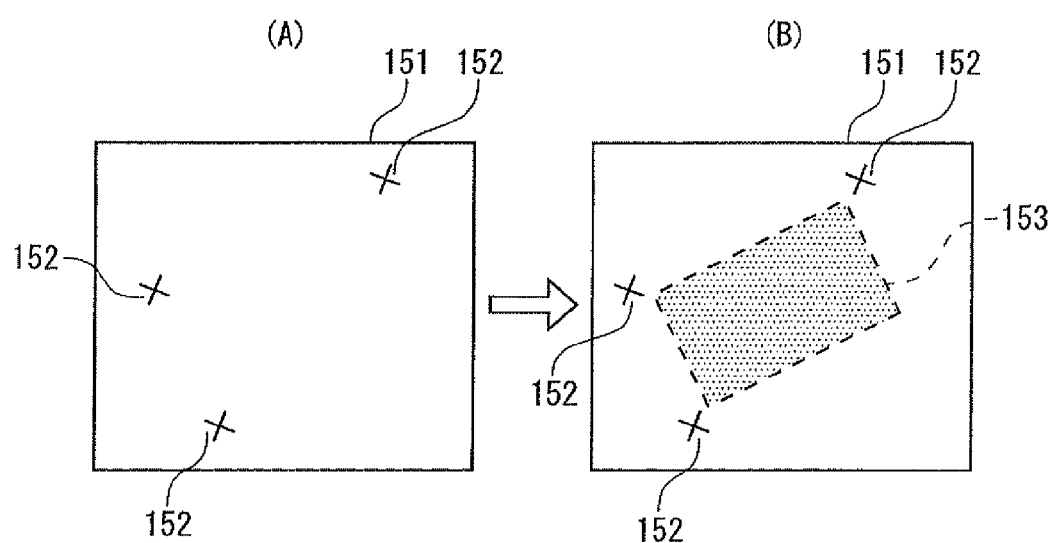
FIG. 19 is a diagram showing a process to detect the encryption region based on the positioning marker.

FIG. 19 is a diagram showing a process of detecting the encryption region based on the positioning marker.

As shown in FIG. 19(A), if at least three of positioning markers 152 are detected from an encryption image 151 by the marker detection unit 141, one of encryption regions 153 can be detected as shown in (B). That is, the three of the positioning markers 152 are arranged at four corners of the encryption region 153 shaped like a rectangle, so that a figure obtained by connecting the three points (the position of the positioning marker 152) with lines becomes a right triangle. If more than three of the positioning markers 152 are detected, the rectangle is the encryption region 153 in which the positional relationship of the three of the positioning markers 152 includes the region constructed with a shape nearly like a right triangle and the position of the three of the positioning markers 152 are arranged to three of the four corners thereof. If two or less of the positioning markers 152 are detected, it is impossible to specify a corresponding encryption region 153. Thus, the decryption processing is finished because there is no encryption image.

Figure 20:
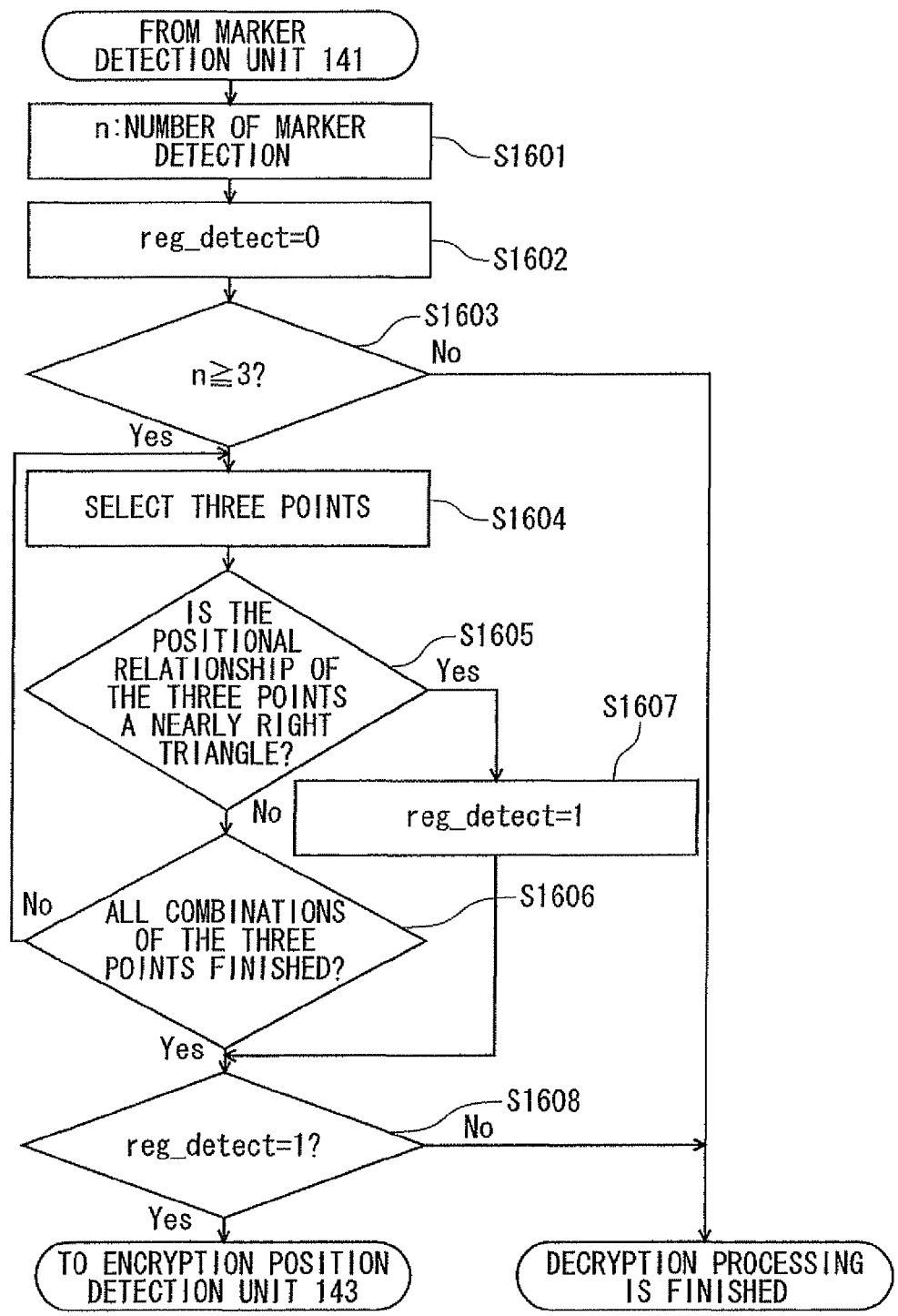
FIG. 20 is a flow chart showing a flow of encryption region detection processing.

FIG. 20 is a flow chart showing a flow of encryption region detection processing.

First, in step S1601, the encryption region detection processing performed by the encryption region detection unit 142 assigns the number of the positioning marker 152 detected by the marker detection unit 141 to a variable n. Then, in step S1602, 0 is assigned to a detecting flag reg_detect of the encryption region 153.

Then, in step S1603, it is determined whether or not the variable n to which the number of the positioning marker 152 is assigned is 3 or greater. If the variable n is 3 or greater, that is, the variable n is two or less (step S1603: No), the decryption including this encryption region detection processing is finished.

On the other hand, if the variable n is 3 or greater (step S1603: Yes), three of the positioning markers 152 which are detected by the marker detection unit 141 are selected in step S1604. In step S1605, it is determined whether or not the positional relationship of the selected three of the positioning markers 152 is nearly a right triangle.

If the positional relationship of the selected three of the positioning markers 152 is not nearly a right triangle (step S1605: No), it is determined whether or not all combinations of the three points of the positioning marker 152 detected by the marker detection unit 141 are finished completely. If the combination are not finished (step S1606: No), the process goes back to step S1604 to select other three points. If the combining is finished (step S1606: Yes), the process goes to step S1608.

On the other hand, if the positional relationship of the selected three of the positioning markers 152 is nearly a right triangle, 1 is assigned to the detecting flag reg_detect in step S1607.

In step S1608, it is determined whether or not 1 is assigned to the detecting flag reg_detect, that is, whether or not three of the positioning markers 152, in which the positional relationship of the three points is shaped like a triangle, can be detected. Then, if 1 is assigned to the detecting flag reg_detect (step S1608: Yes), the process goes to the processing of the encryption position detection unit 143. If 1 is not assigned to the detecting flag reg_detect (step S1608: No), the encryption processing including this encryption region detection processing is finished.

FIG. 18 will be described again.

By taking advantage that a regular distribution of pixel is formed in the edge part of the encryption region 153 detected by the encryption region detection unit 142, the encryption position detection unit 143 detects a detailed position of each pixel of the encryption image 153 by the frequency analysis and the pattern matching in order to decrypt the encryption image 153 with accuracy. This detection uses the characteristic that the entirety of the encryption image 153 forms the regular pattern by the pixel value conversion (inversion) processing of the pixel value conversion unit 33.

As one of the detection methods, it is possible to obtain a period of the pattern by a frequency analysis method such as a Fast Fourier Transform (FFT) with respect to the transverse direction and the longitudinal direction of the image, and the boundary position (offset) is detected by template matching or the like.

Furthermore, by taking advantage that the boundary part is shaped like a line when the encryption image is filtered with an edge detecting filter (a Laplacian filter or the like), it is possible to detect the boundary position by Hough transform.

Figure 21:
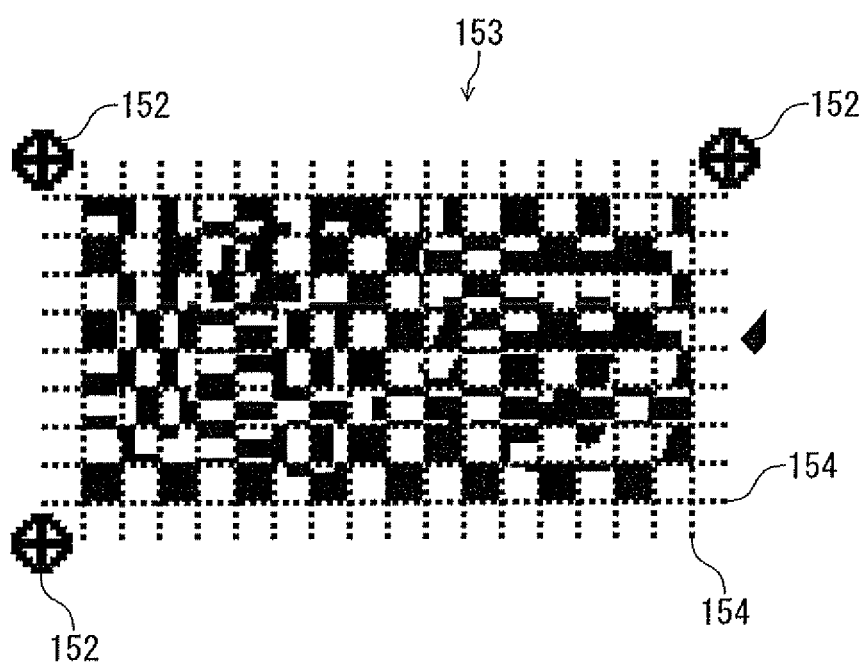
FIG. 21 is a diagram showing an example of a case when an encryption position is detected.

FIG. 21 is a diagram showing an example of a case when the encryption position is detected.

If the encrypted digital image 41 is complex, part of periodicity of the encryption image 44 may be seriously destroyed. In such case, it is effective to use a method for performing the encryption position detection on the image region to be used for calculation of the period of the pattern and the boundary position only to the part where the periodicity is relatively strong.

FIG. 18 will be described again.

By using encryption position information detected by the encryption position detection unit 143 and the decryption key inputted by a user, the image inverse conversion unit 144 performs inverse conversion processing of the conversion processing by the image converting unit 32 on the encryption image 44 in a way corresponding to the encryption key in order to generate the encryption image. The description of the processing procedure is omitted because the processing procedure of the decryption is achieved in a reverse procedure to the processing procedure of the encryption.

As describe above, the description was made of the first embodiment applying the present invention.

Next, description will be made of a second embodiment applying the present invention.

Figure 22:
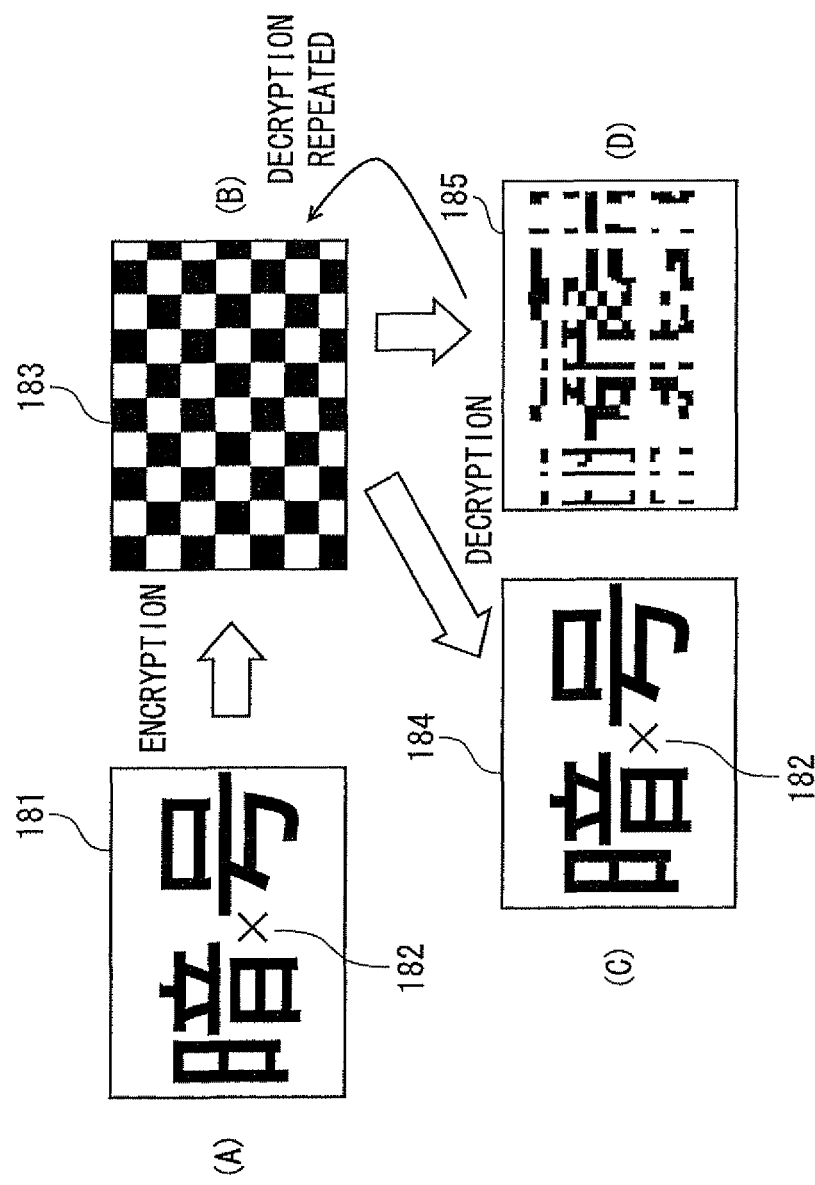
FIG. 22 is a diagram showing an entire image of a second embodiment.

FIG. 22 is a diagram showing a whole image of the second embodiment.

In the second embodiment, before the encryption processing, a check mark 182 specified to verify the validity of the decryption of the encryption image 18 is added to an arbitrary position of a region 181 to be encrypted (FIG. 22(A)), and the encryption is performed (FIG. 22(B)). After an encryption image 183 is decrypted, if the check mark 182 which was added in advance is detected from an decryption image 184, it is considered that the decryption was performed successfully, so that the decryption is finished (FIG. 22(C)). If the check mark 182 is not detected (FIG. 22(D)), the encryption position is corrected, and the decryption processing is repeated until when the check mark 182 is detected or when a predetermined standard is met.

Figure 23:
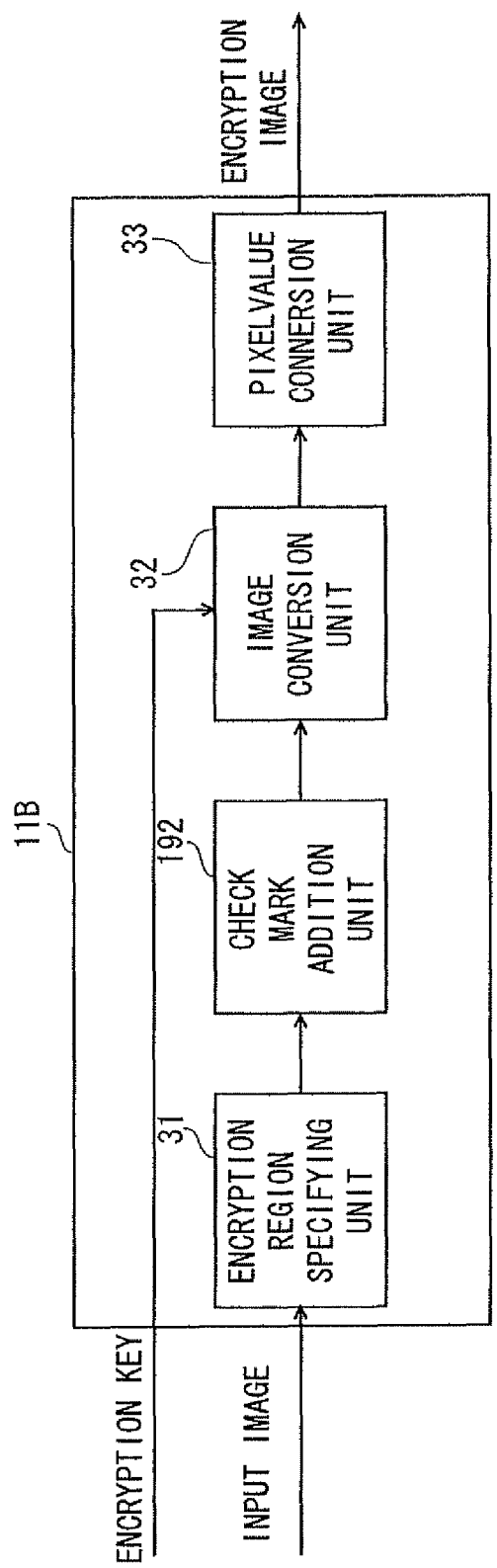
FIG. 23 is a diagram showing an overview of the encryption processing according to the second embodiment.

FIG. 23 is a diagram showing an overview of the encryption processing according to the second embodiment.

In FIG. 23, the encryption unit 11B includes an encryption region specifying unit 31, a check mark addition unit 192, an image conversion unit 32, and a pixel value conversion unit 33.

As well as in the first embodiment, the encryption region specifying unit 31 selects the region to be encrypted from the input image including the region which is desired to be encrypted.

Then the check mark addition unit 192 adds the specified check mark 182 to an arbitrary position of the region 181 to be encrypted in order to verify the validity of the decryption of the encryption image 183. It is preferable to add the check mark 182 to the region in which the pixel distribution is flat and the image information is contained as little as possible.

As well as in the first embodiment, after the check mark 182 is added to the specified position, the region 181 to be encrypted and the encryption key are inputted in the image conversion unit 32, the region 181 which is encrypted by a method corresponding to the encryption key is visually converted. In the pixel value conversion unit 33, the pixel of the processing image converted by the image conversion unit 32 is converted at a certain interval. Then the conversion image is formed in a nearly lattice-shaped strip pattern.

Figure 24:
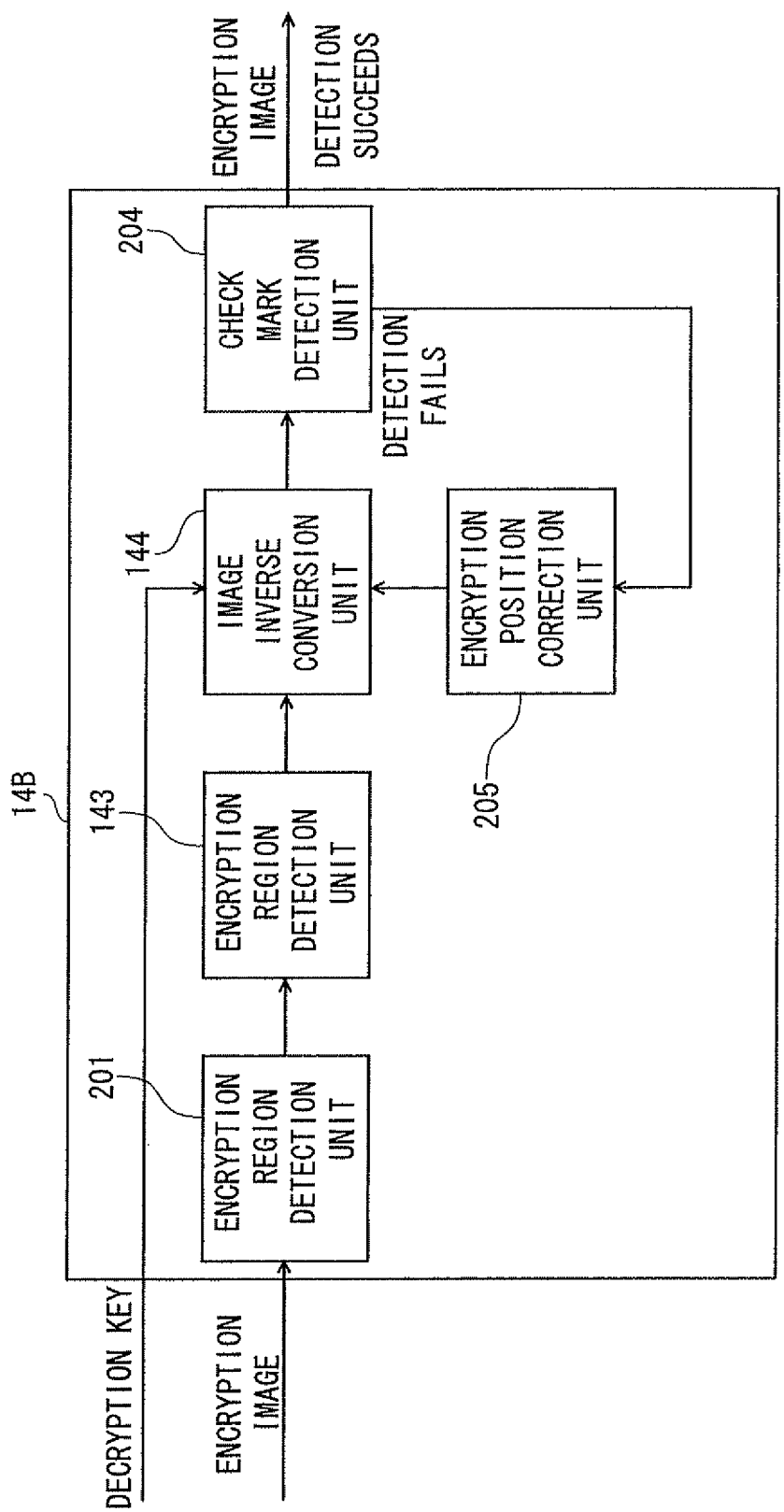
FIG. 24 is a diagram showing an overview of the decryption processing according to the second embodiment.

FIG. 24 is a diagram showing an overview of the decryption processing according to the second embodiment.

In FIG. 24, the decryption unit 14B includes an encryption region detection unit 201, an encryption position detection unit 143, an image inverse conversion unit 144, a check mark detection unit 204, and an encryption position correction unit 205.

First, the encryption region detection unit 201 detects a broad region of the encryption image 183. Since the pixel distribution of the encryption image 183 is shaped like a nearly checkered pattern by the encryption processing of the encryption unit 11B, power of the frequency corresponding to the period of the stripe becomes remarkably strong when the frequency analysis such as the FFT is performed with respect to the transverse direction and the longitudinal direction thereof, respectively.

Figure 25:
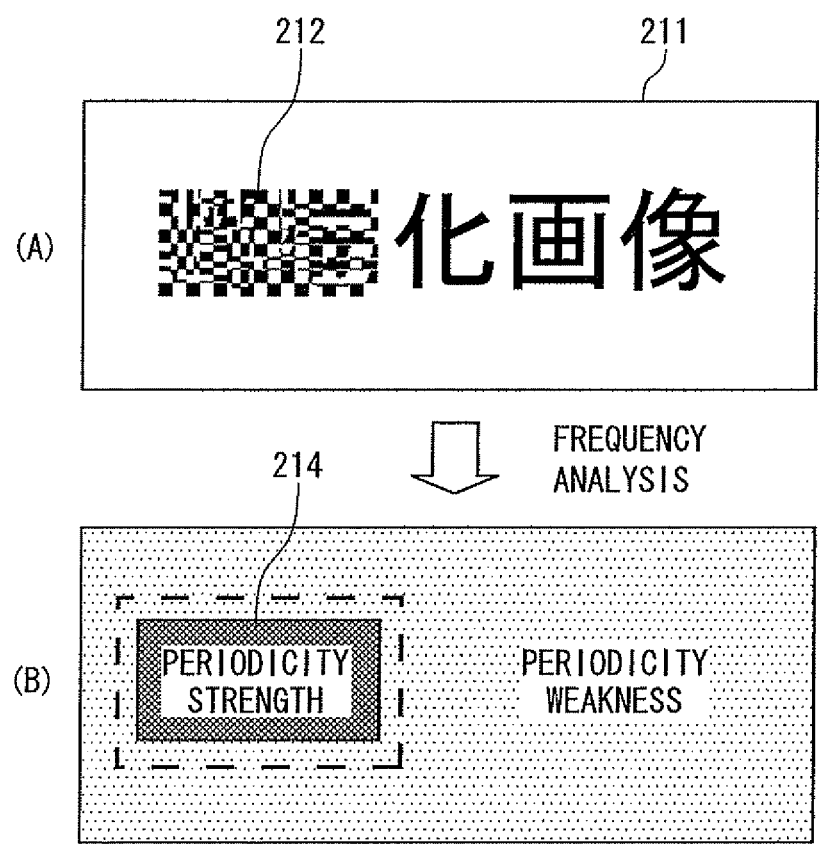
FIG. 25 is a diagram illustrating a detection method of the encryption region.

FIG. 25 is a diagram illustrating the detection method of the encryption region.

As shown in FIG. 25(A), when an encryption image 211 is frequency analyzed, the region in which the power of a certain frequency (an integral multiple of the frequency) is outstand is presented as "periodicity strength" 214. The periodicity of the pixel distribution tends to be strong in the encryption region. This makes it possible to detect a broad encryption region and the period of the stripe pattern.

FIG. 24 will be described again.

After the broad region of the encryption is specified by the encryption region detection unit 201, the encryption position detection unit 143 further accurately detects the encryption region as well as detects the detailed position of each pixel of the encryption region at the same time. As one example of position detection, there may be a method for obtaining the boundary position (offset) of pixel value conversion by the period of the stripe pattern and the distribution of pixel absolute value difference which was obtained by the encryption region detection unit 201, and for narrowing the regions in which the pixel absolute value difference is relatively big. Moreover, as well as the encryption position detection unit 143 of the first embodiment, the Hough transform can be used to detect the encryption position.

Figure 26:
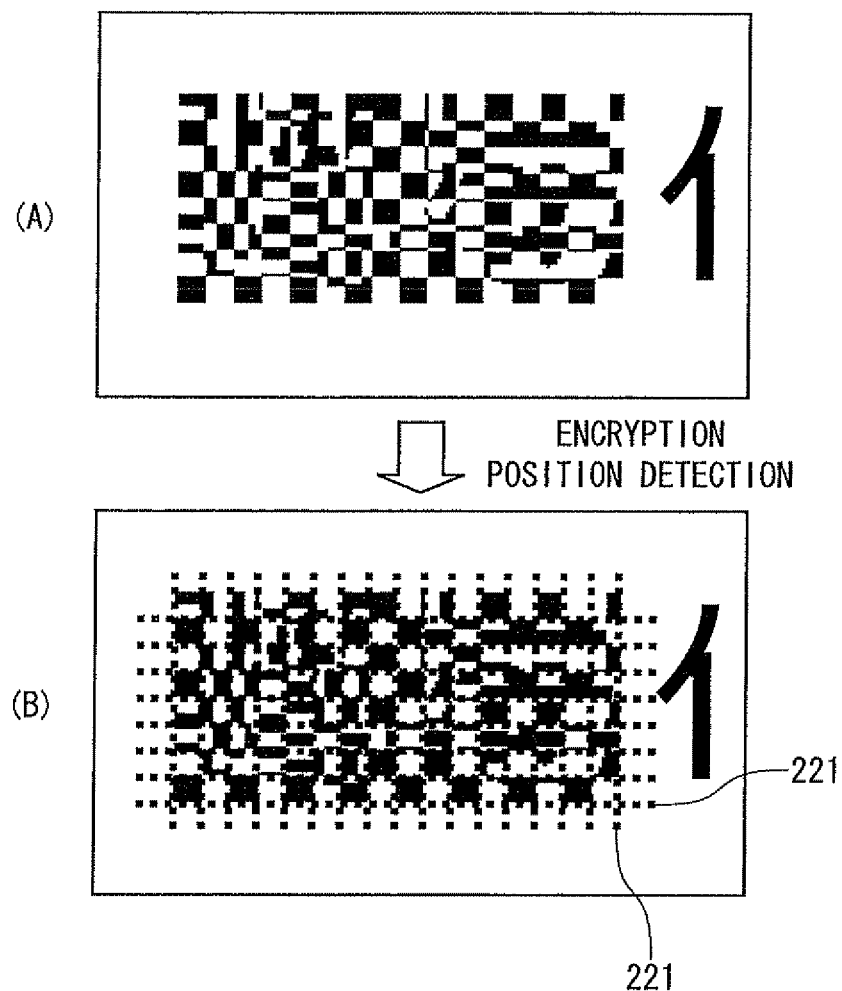
FIG. 26 is a diagram illustrating the detection method of the encryption position (in a transverse direction)

FIG. 26 is a diagram illustrating the detection method of the encryption position.

If the above described encryption region detection processing is performed respectively in a transverse direction and a longitudinal direction, an check mark 221 that shows encryption position is detected as shown in FIG. 26.

FIG. 24 will be described again.

The image inverse conversion unit 144 performs the same method as that of the first embodiment in order to generate the decryption image by using the encryption position information and the decryption key The check mark detection unit 204 attempts to detect the check mark from the decryption image which is decrypted by the image inverse conversion unit 144. The description is omitted because the detection method is the same as that of marker detection processing according to the first embodiment. Then, if the check mark is detected, the decryption image is outputted and the processing is finished. If the check mark is not detected, the encryption position is corrected by the encryption image correction unit 205. Then the decryption processing (image inverse conversion processing) is repeated until when the check mark is detected or when the predetermined standard is met.

Figure 27:
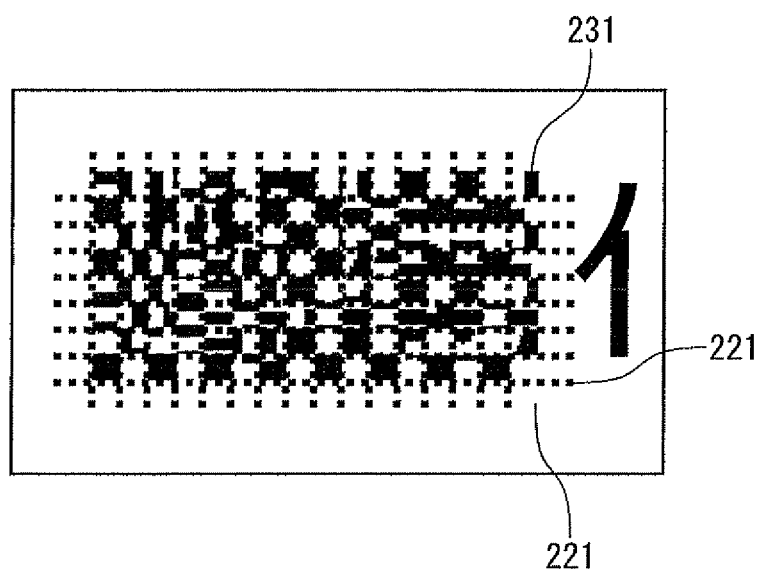
FIG. 27 is a diagram showing an example of a case when detection of the encryption position fails.

FIG. 27 is a diagram showing an example of a case when the encryption position is detected incorrectly.

As shown in FIG. 27, the edge of the encryption image may be overlooked (Area that comes off from preference field 231). Therefore, if the detection of a check mark 221 fails, the image inverse conversion processing is performed by adding or deleting a line indicating the encryption position to/from the right and left edges and the top and bottom edges to consider whether or not the check mark 221 can be detected. If the check mark 221 can not be detected even though the line is added or deleted, the processing is finished without outputting the decryption image.

As above, the second embodiment applying the present invention was described.

Next, description will be made of a third embodiment applying the present invention.

In the third embodiment of the present invention, the encryption and decryption of image are performed by using both the positioning marker for specifying the encryption region shown in the first embodiment and the check mark for verifying the validity of the decryption image of the second embodiment. By using these two kinds, i.e., the positioning marker for detecting the position and the check mark for verifying the decryption image, it is possible to reduce image decryption error in a case when a correct decryption key is inputted.

Figure 28:
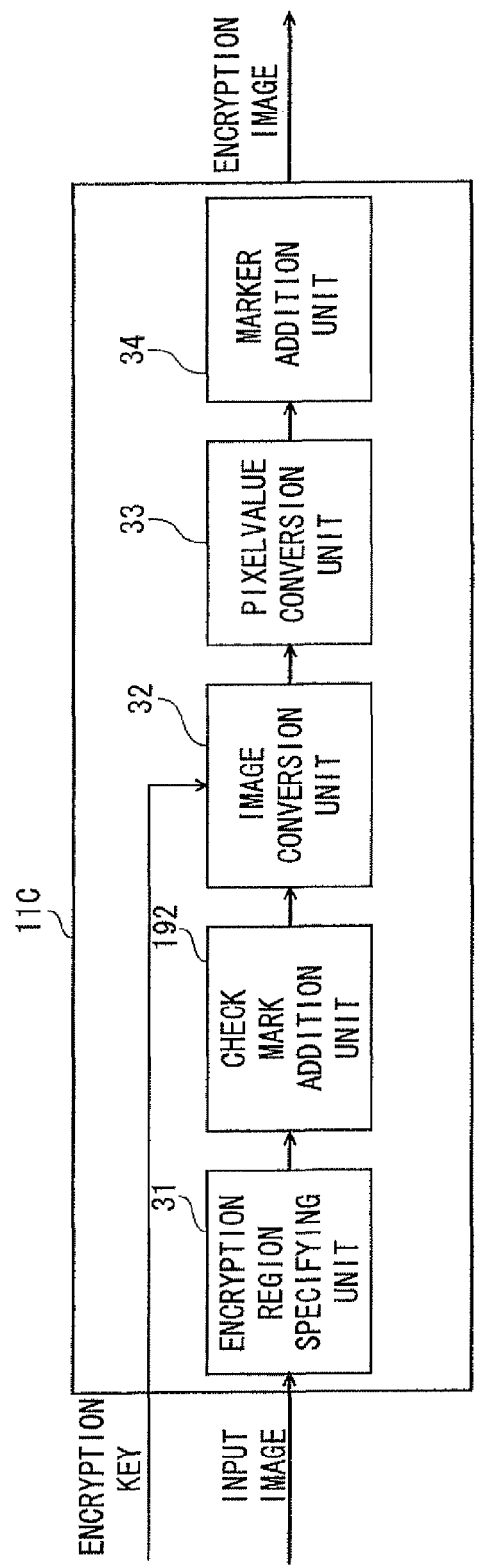
FIG. 28 is a diagram showing an overview of the encryption processing according to a third embodiment.

FIG. 28 is a diagram showing an overview of the encryption processing according the third embodiment.

In FIG. 28, the encryption unit 11C includes an encryption region specifying unit 31, a check mark addition unit 192, an image conversion unit 32, a pixel value conversion unit 33, and a marker addition unit 34.

First, the encryption region specifying unit 31 selects the image region to be encrypted. The check mark addition unit 192 adds the check mark for verifying the decryption image in the same way as that of the second embodiment. After the check mark is added, the image conversion unit 32 and the pixel value conversion unit 33 perform the encryption processing to encrypt the image in the same way as that of the first and second embodiments. Then the marker addition unit 34 adds the positioning marker for detecting the position in the same way as that of the first embodiment. The description is omitted because the content of each processing is the same as that of the first embodiment or the second embodiment.

Figure 29:
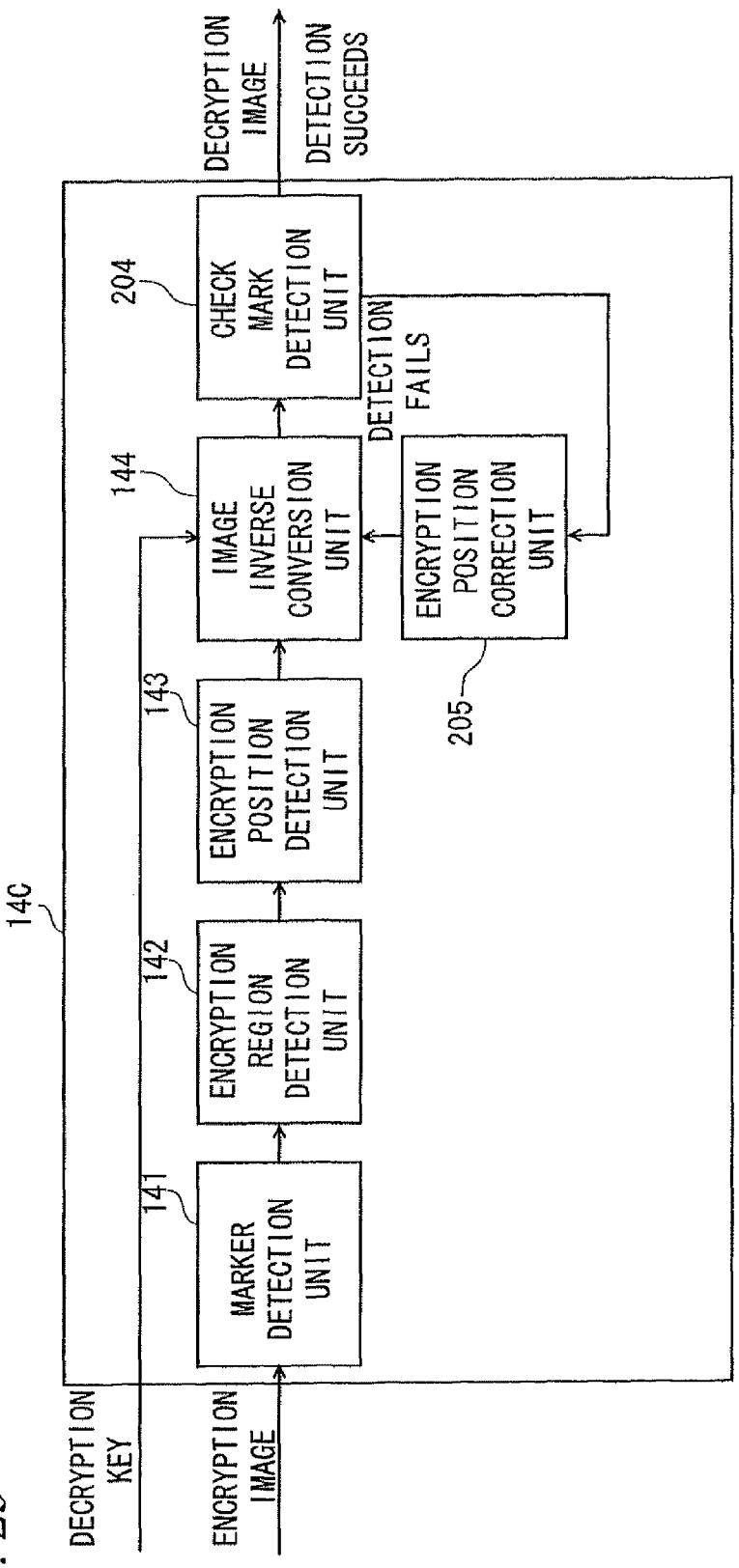
FIG. 29 is a diagram showing an overview of the decryption processing according to the third embodiment.

FIG. 29 is a diagram showing the overview of the decryption processing according to the third embodiment.

In FIG. 29, the decryption unit 14C includes a marker detection unit 141, an encryption region detection unit 142, a decryption position detection unit 143, an image inverse conversion unit 144, a check mark detection unit 204, and an encryption position correction unit 205.

First, the marker detection unit 141 detects the positioning marker in the same way as that of the first embodiment. Then the encryption region detection unit 142 detects the encryption region in the same way as that of the first embodiment. Further, the decryption position detection unit 143 detects the detailed position of each pixel of the encryption region in the same way as that of the first embodiment. The description omitted because each of the processing procedures performed in the image inverse conversion unit 144, the check mark detection unit 204 and the encryption position correction unit 205 is the same as that of the second embodiment.

As above, the third embodiment applying the present invention was described.

As described above, the embodiments of the present invention were described with reference to the figures. The processing apparatus, to which the present invention is applied, performing the encryption processing and the decryption processing is not limited to the above described embodiments as long as the function thereof is performed. It is needless to say that the processing apparatus can be a stand-alone apparatus, a system or an integrated device comprising a plurality of apparatuses, or a system in which the processing is performed through a network such as a LAN or a WAN.

Figure 30:
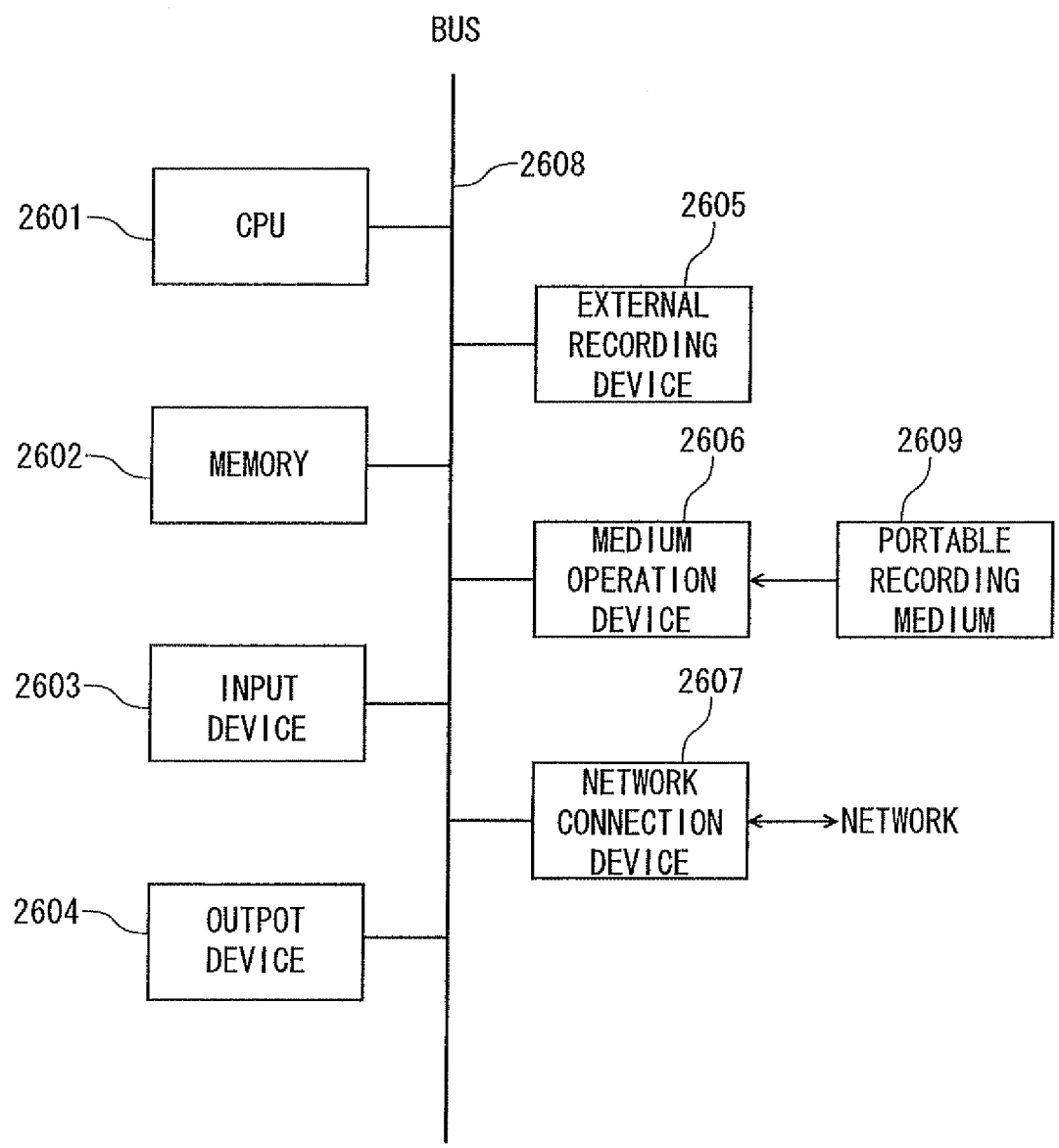
FIG. 30 is a configuration diagram of a processing apparatus performing the encryption processing and the decryption processing according to the present invention.

Furthermore, as shown in FIG. 30, the embodiments can be achieved by the system comprising a CPU 2601 connected to a buss 2608, a memory 2602 such as a ROM or a RAM, an input device 2603, an output device 2604, an external recording device 2605, a medium operation device 2606, a portable recording medium 2609, and a network connection device 2607. That is, it is needless to say that the function of the embodiments can be achieved when the processing apparatus is provided with the memory 2602 such as a ROM or a RAM in which a program code of software achieving the system of the above described embodiments, the external recording device 2605 and the portable recording medium 2609, and the program code is read and performed by a computer of the processing apparatus.

In this case, the program code itself which is read from the portable recording medium 2609 or the like achieves a new function of the present invention. Thus, the portable recording medium 2609 or the like recording this program code configures the present invention.

As the portable recording medium 2609 for providing the program code, it is possible to use various recording media for recording through such as a flexible disk, a hard disk, an optical disk, a magnet-optical disk, a CD-ROM, a CR-R, a DVD-ROM, a DVD-RAM, a magnetic tape, a nonvolatile memory card, a ROM card, an e-mail, or the network connection device 2607 such as a personal computer communication (a communication line in other words).

Figure 31:
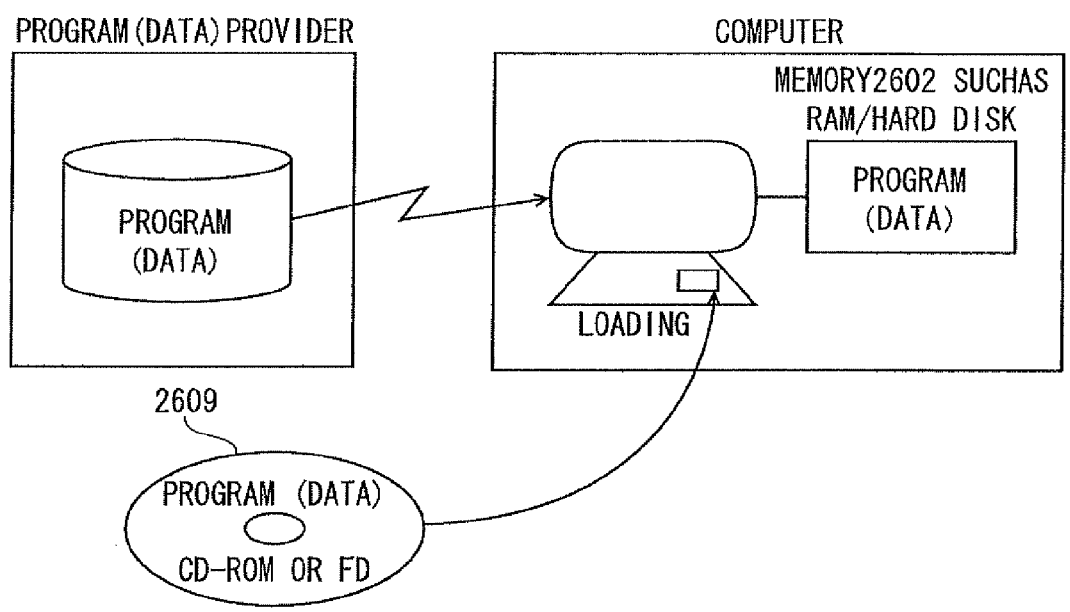
FIG. 31 is a diagram illustrating loading of an encryption and decryption program to a computer according to the present invention.

Furthermore, as shown in FIG. 31, the functions of the above described embodiments are achieved by performing the program code read out by the computer on the memory 2602. In addition to this, part or entirety of the actual processing is performed by an OS or the like running on the computer based on a direction of the program code. The functions of the above described embodiments are achieved also by the processing thereof.

Moreover, after the program code which is read from the portable recording medium 2609 or the program (data) which is provided by the program (data) provider is written on the memory 2602 provided in a function enhancement board inserted to the computer or in a function enhancement unit connected to the computer. Then the CPU 2601 or the like provided in the function enhancement board or the function enhancement unit performs part or entirety of the actual processing based on the direction of the program code. The above described functions of the embodiments are achieved also by the processing thereof.

Figure 32:
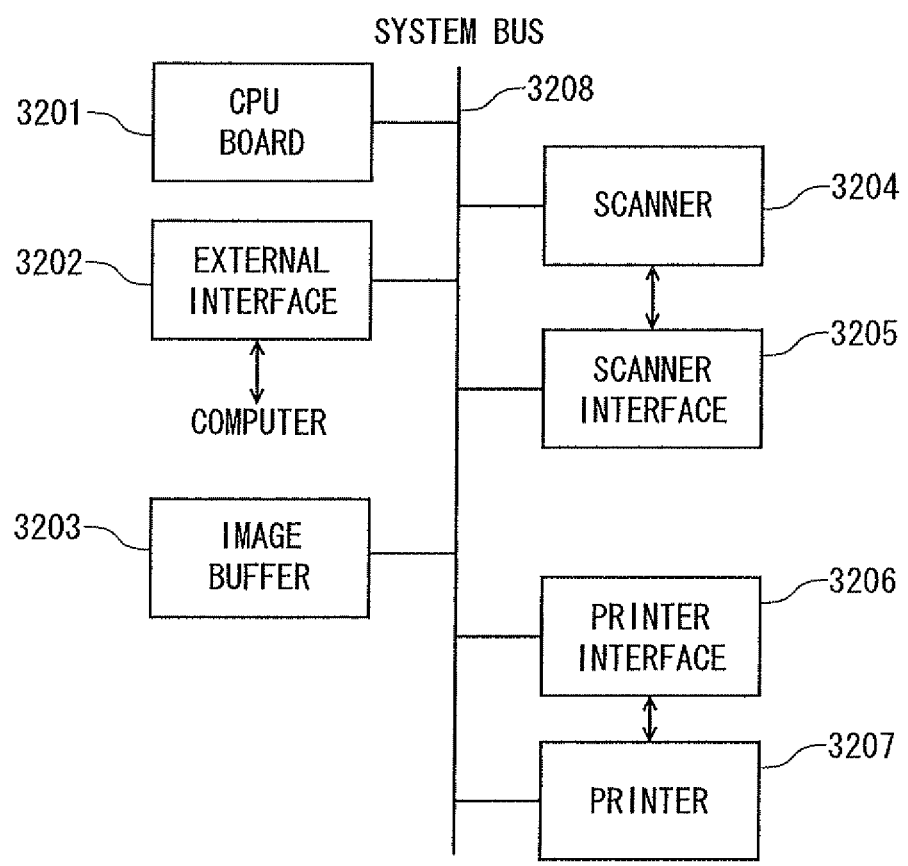
FIG. 32 is a diagram showing another example of a system configuration of a case when the encryption processing and the decryption processing of the present invention are applied to a multifunction printer.

Aside from FIG. 30, FIG. 32 is a diagram showing another example of a system configuration of a case when the encryption processing and the decryption processing of the present invention are applied to the multifunction printer.

In FIG. 32, a CPU board 3201 controls the entirety of the system through a system bus 3208. An external interface 3202 has a function for connecting to an external computer. A scanner interface 3205 plays a role in performing interface control with a scanner 3204. The image information read from the scanner 3204 is stored in an image buffer 3203. A printer interface 3206 plays a role in performing interface control with a printer 3207.

Figure 33:
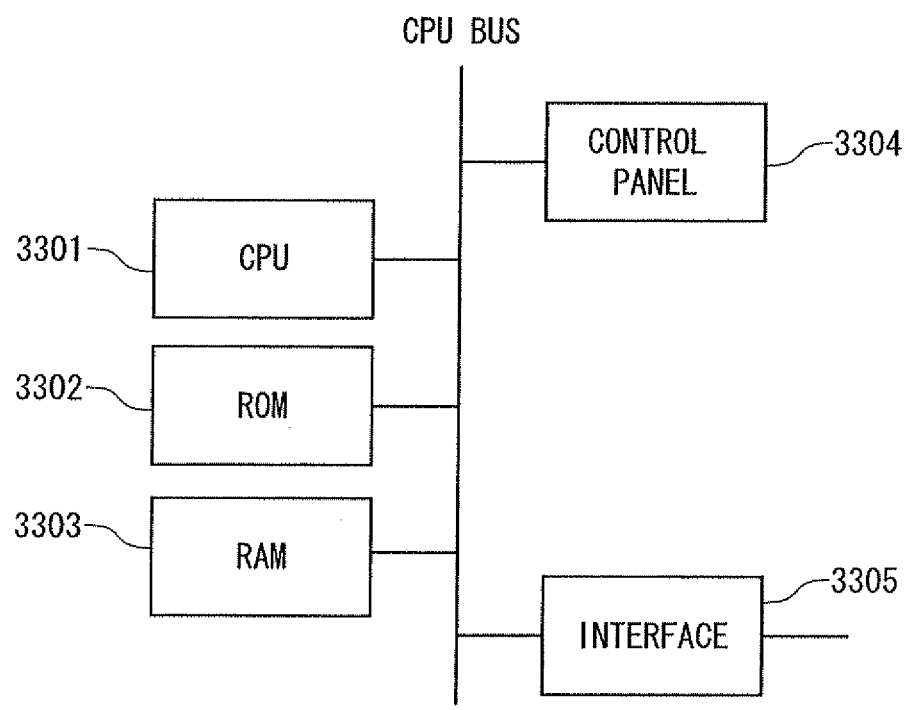
FIG. 33 is a diagram showing a configuration of a CPU board 3201 of FIG. 32.

FIG. 33 is a diagram showing a configuration of the CPU board 3201.

In FIG. 33, a CPU 3301 controls the entirety of the system. The program of the encryption processing and the decryption processing to be performed by the CPU board 3201 is stored in a ROM 3302. A RAM 3303 temporary stores various data and the like necessary for performing the encryption processing and the decryption processing. Moreover, a control panel 3304 has a function for accepting a key-input by the user and a function for displaying a message or the like to the user. Further, an interface 3305 is an interface for connecting the CPU board 3201 to the system bus 3208 shown in FIG. 32.

The system shown in FIG. 32 and FIG. 33 allows the multifunction printer to achieve the encryption processing and the decryption processing of the present invention.

That is, the present invention is not limited to the above mentioned embodiments, but can apply to various configurations or shapes, such as a printer or a facsimile, without departing from the scope of the present invention.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of transmission communication media includes a carrier-wave signal.

Further, according to an aspect of the embodiments of the invention, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image encryption apparatus that encrypts a digital image, the image encryption apparatus comprising:
a computer processor to execute:
specifying a partial region to be encrypted from the digital image;
converting the partial region including micro regions into a processing image based on an encryption key; and
regularly converting a pixel value of the processing image in terms of a smaller converted region of a micro region to specify a position of the micro region of the partial region, thereby generating a conversion image that specifies positions of the micro regions.

2. The image encryption apparatus according to claim 1, wherein the digital image is digitally imaged by digitally imaging a non-digital image including a PDF format, an HTML and/or XML document, or an editable document, or any combinations thereof.

3. The image encryption apparatus according to claim 1, wherein the partial region is divided into the micro regions and the divided micro regions are rearranged based on the encryption key.

4. The image encryption apparatus according to claim 1, wherein the converting comprises converting the micro regions by an arbitrary compression method into compressed data and arranging each bit of the compressed data as a white pixel or a black pixel of an arbitrary size.

5. The image encryption apparatus according to claim 1, wherein the conversion image is generated by forming a nearly stripe pattern by converting the pixel value at a certain interval with respect to a transverse direction of the processing image and converting the pixel value at the certain interval with respect to a longitudinal direction of the processing image.

6. The image encryption apparatus according to claim 1, wherein the computer processor further adds a specific marker to the conversion image generated to specify a position of the converted partial region.

7. The image encryption apparatus according to claim 6, wherein the marker is shaped like a circle or a polygonal with a solid line in which there are a plurality of lines intersecting a circumference of the circle or the polygonal inside therein.

8. The image encryption apparatus according to claim 6, wherein a foreground of the marker is formed by pixel value conversion.

9. The image encryption apparatus according to claim 1, wherein the computer processor further adds a specific check mark for verifying a validity of decryption of the conversion image before the partial region is specified.

10. The image encryption apparatus according to claim 1, wherein the digital image is generated by converting non-digital data into the digital image.

11. The image encryption apparatus according to claim 6, wherein the conversion image is decryptable by:
detecting the specific marker added to the conversion image specifying a position of the converted partial region;
detecting a conversion position in which a pixel value is regularly converted in the converted partial region; and
decrypting the converted partial region into a digital image based on the conversion position and a decryption key.

12. The image encryption apparatus according to claim 9, wherein the conversion image is decryptable by:
detecting a converted partial region;
detecting a conversion position in which a pixel value is regularly converted in the converted partial region;
decrypting the converted partial region into a digital image based on the conversion position and an decryption key; and
detecting the specific check mark verifying a validity of the decryption.

13. The image encryption apparatus according to claim 9, wherein the conversion image is decryptable by:
detecting a specific marker added to the conversion image specifying a position of the converted partial region;
detecting a conversion position in which a pixel value is regularly converted in the converted partial region;
decrypting the converted partial region into a digital image based on the conversion position and an decryption key; and
detecting a specific check mark verifying a validity of the decryption.

14. The image decryption apparatus according to claim 12, wherein the detected conversion position is corrected in a case when the check mark is not detected.

15. The image encryption apparatus according to 11, wherein the conversion image to be decrypted is generated by reading a print of a conversion image.

16. The image encryption apparatus according to claim 11, wherein the conversion image to be decrypted is generated by non-imaging a conversion image, and digitally imaging the non-imaged image once again.

17. A method of encrypting a digital image, the method comprising:
specifying a partial region to be encrypted from the digital image;
converting the partial region including micro regions into a processing image based on an encryption key; and
regularly converting a pixel value of the processing image in terms of a smaller converted region of a micro region to specify a position of the micro region of the partial region, thereby generating a conversion image that specifies positions of the micro regions.

18. The method according to claim 17, wherein the digital image is digitally imaged by digitally imaging non-image data including a PDF format, an HTML and/or XML document, or an editable document, or any combinations thereof.

19. The image encrypting method according to claim 17, wherein the conversion image is generated by adding a specific marker to the generated conversion image specifying a position of the converted partial region.

20. The method according to claim 17, further comprising:
detecting a specific marker added to the conversion image specifying a position of the converted partial region;
detecting a conversion position in which a pixel value is regularly converted in the converted partial region; and
decrypting the converted partial region into a digital image based on the conversion position and a decryption key.

21. The method according to claim 17, further comprising:
detecting a converted partial region;
detecting conversion position in which a pixel value is regularly converted in the converted partial region;
decrypting the converted partial region into a digital image based on the conversion position and a decryption key; and
detecting the specific check mark verifying a validity of the decryption.

22. The method according to claim 17, further comprising:
detecting a specific marker added to the conversion image specifying a position of the converted partial region;

detecting a conversion position in which a pixel value is regularly converted in the converted partial region;

decrypting the converted partial region into a digital image based on the conversion position and a decryption key; and detecting a specific check mark for verifying a validity of the decryption.

23. An apparatus for encrypting a printed document, comprising:

a controller configured to:

specifying a partial region to be encrypted from a digital image of the printed document;

converting the partial region including micro regions into a processing image based on an encryption key; and regularly converting a pixel value of the processing image in terms of a smaller converted region of a micro region to specify a position of the micro region of the partial region, thereby generating a conversion image that specifies positions of the micro regions.

\* \* \* \* \*

UNITED STATES PATENT AND TRADEMARK OFFICE
CERTIFICATE OF CORRECTION

PATENT NO. : 8,515,062 B2  
APPLICATION NO. : 12/129266  
DATED : August 20, 2013  
INVENTOR(S) : Shohei Nakagata et al.

Page 1 of 1

It is certified that error appears in the above-identified patent and that said Letters Patent is hereby corrected as shown below:

In the Claims

In Col. 18, Line 23, In Claim 15 delete "11" and insert -- claim 11 --, therefor.

Signed and Sealed this  
Twelfth Day of November, 2013

Teresa Stanek Rea  
*Deputy Director of the United States Patent and Trademark Office*